US012560786B2

(12) United States Patent
Imaoka

(10) Patent No.: US 12,560,786 B2
(45) Date of Patent: Feb. 24, 2026

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 348 days.

(21) Appl. No.: 18/381,792

(22) Filed: Oct. 19, 2023

(65) Prior Publication Data

US 2024/0045185 A1 Feb. 8, 2024

Related U.S. Application Data

(63) Continuation of application No. PCT/JP2021/043684, filed on Nov. 29, 2021.

(30) Foreign Application Priority Data

May 10, 2021 (JP) ................................. 2021-079961

(51) Int. Cl.
*G02B 15/14* (2006.01)
*G02B 13/00* (2006.01)
(52) U.S. Cl.
CPC ................ *G02B 15/143103* (2019.08); *G02B 13/0095* (2013.01); *G02B 15/144111* (2019.08)
(58) Field of Classification Search
CPC .... G02B 15/143103; G02B 15/144103; G02B 15/144107; G02B 15/144111;
(Continued)

(56) References Cited

U.S. PATENT DOCUMENTS 7,791,816 B2 * 9/2010 Cho ................... G02B 15/1421
359/683
9,910,251 B2 * 3/2018 Oe ....................... G02B 15/177
(Continued)

FOREIGN PATENT DOCUMENTS

JP 2018-97046 6/2018
JP 2019-132904 8/2019
(Continued)

OTHER PUBLICATIONS

Translation of International Preliminary Report on Patentability issued Nov. 14, 2023 in corresponding International (PCT) Application No. PCT/JP2021/043684.
(Continued)

*Primary Examiner* — Bumsuk Won
*Assistant Examiner* — Seth D Moser
(74) *Attorney, Agent, or Firm* — Wenderoth, Lind & Ponack, L.L.P.

(57) ABSTRACT

The present disclosure is directed to an optical system internally having an intermediate imaging position MI that is conjugate with both of a magnification conjugate point on a magnification side and a reduction conjugate point on a reduction side, the optical system including: a first positive lens group GP1 including a plurality of lens elements and positioned on the magnification side with respect to the intermediate imaging position; a second positive lens group GP2 including a plurality of lens elements and positioned between the first positive lens group GP1 and the intermediate imaging position M1; and a negative lens group GN including a plurality of lens elements and positioned on the reduction side with respect to the intermediate imaging position MI, wherein, during focusing, the first positive lens group GP1 and the negative lens group GN move in an
(Continued)

optical axis direction, and the second positive lens group GP2 is stationary.

14 Claims, 26 Drawing Sheets

(58) Field of Classification Search
CPC .... G02B 15/145103; G02B 15/145107; G02B 15/145111; G02B 15/145115; G02B 15/145127; G02B 15/20; G02B 13/04; G02B 13/16; G02B 13/18
USPC .................................................. 359/676, 680
See application file for complete search history.

(56) References Cited

U.S. PATENT DOCUMENTS

| | | | | |
|---|---|---|---|---|
| 2015/0234157 | A1* | 8/2015 | Ichimura | G02B 13/16 |
| | | | | 359/434 |
| 2018/0059394 | A1* | 3/2018 | Amano | G02B 13/16 |
| 2018/0164554 | A1* | 6/2018 | Shiokawa | G02B 13/16 |
| 2019/0235206 | A1* | 8/2019 | Ichimura | G02B 15/1451 |
| 2019/0306390 | A1* | 10/2019 | Nagatoshi | G03B 21/142 |
| 2020/0241400 | A1* | 7/2020 | Yoshida | G03B 21/147 |
| 2021/0033831 | A1* | 2/2021 | Kurokawa | G02B 15/143105 |
| 2021/0333526 | A1* | 10/2021 | Imaoka | G03B 21/14 |
| 2021/0341715 | A1* | 11/2021 | Zhao | G02B 15/145527 |
| 2021/0356693 | A1 | 11/2021 | Imaoka et al. | |
| 2022/0308325 | A1* | 9/2022 | Amano | G02B 13/16 |
| 2023/0384571 | A1* | 11/2023 | Zhao | G02B 13/0095 |

FOREIGN PATENT DOCUMENTS

| | | |
|---|---|---|
| JP | 2020-106660 | 7/2020 |
| WO | 2020/174761 | 9/2020 |

OTHER PUBLICATIONS

Office Action issued Sep. 2, 2025 in Japanese Patent Application No. 2023-520748, with English-language Translation.

International Search Report issued Feb. 15, 2022 in International (PCT) Application No. PCT/JP2021/043684.

Extended European Search issued Oct. 17, 2024 in European Patent Application No. 21942002.3.

Office Action issued Oct. 21, 2025 in corresponding Japanese Patent Application No. 2023-520748, with English machine translation.

* cited by examiner

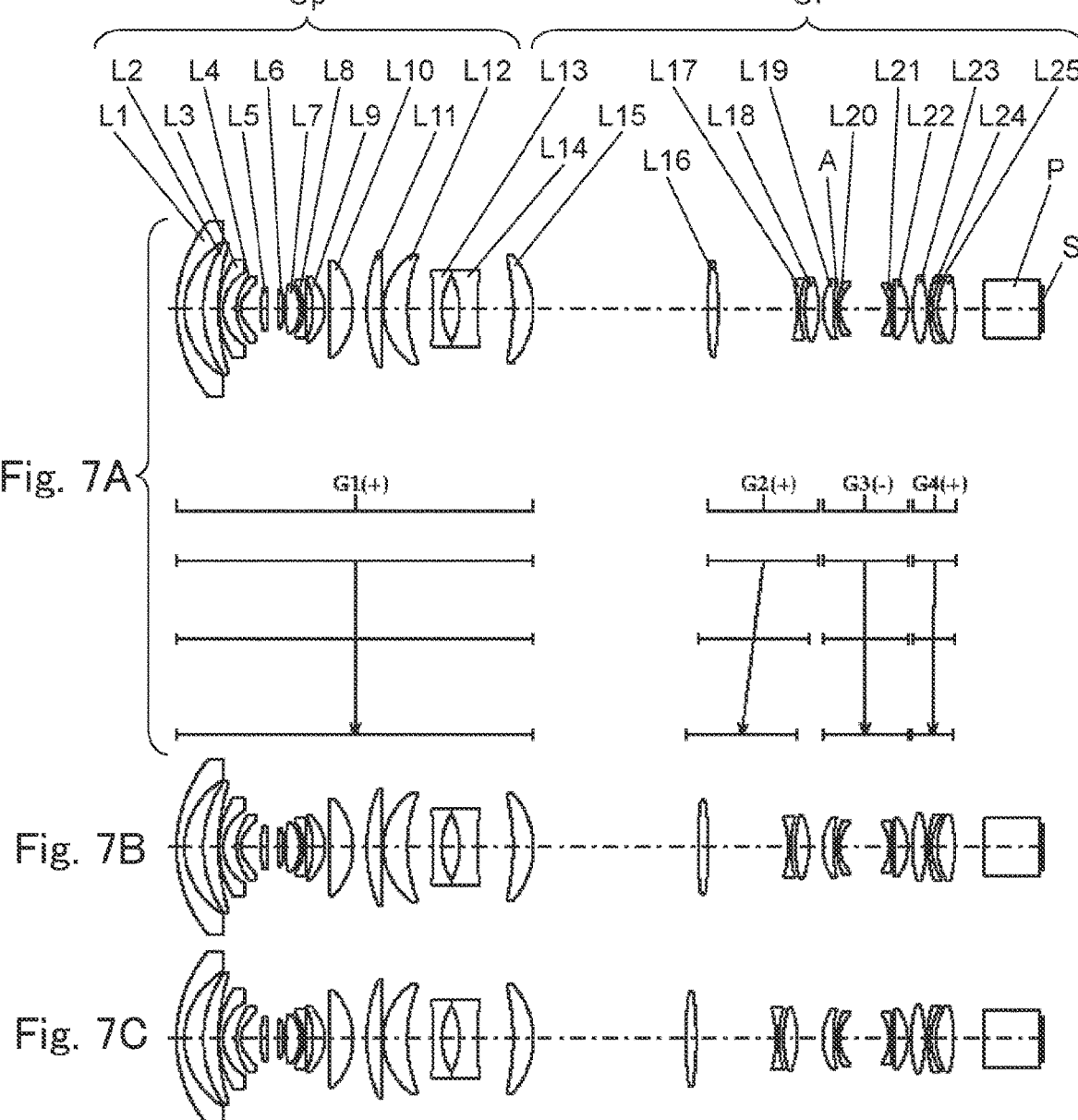

OPTICAL SYSTEM, IMAGE PROJECTION APPARATUS, AND IMAGING APPARATUS

CROSS-REFERENCE TO RELATED APPLICATIONS

This application is a continuation of International Patent Application No. PCT/JP2021/043684, filed on Nov. 29, 2021, which claims the benefit of Japanese Patent Application No. 2021-079961, filed on May 10, 2021, the contents all of which are incorporated herein by reference.

TECHNICAL FIELD

The present disclosure relates to an optical system that forms an intermediate image. The present disclosure also relates to an image projection apparatus and an imaging apparatus using such an optical system.

BACKGROUND ART

Intermediate imaging-based optical systems have an advantage of achieving wide-angle projection with a short focal length and a wide screen. However, as the field of view is wider-angle, aberration fluctuation, such as field curvature aberration, astigmatism, etc., becomes larger during focus adjustment for an object distance, thereby possibly degrading the optical performance.

Patent Document 1 discloses a wide-angle imaging optical system, wherein focus adjustment is preformed using two focus groups located on the magnification side with respect to the intermediate image. Therefore, in this imaging optical system, the center of gravity is positioned on the magnification side of the optical system due to the driving member including actuators that constitute the focus groups. Further, in this imaging optical system, fluctuation of the off-axis curvature of field during focusing reaches about 0.05 mm.

Patent Document 2 discloses a wide-angle imaging optical system, wherein focus adjustment is preformed using two or three focus groups. In case of using two focus groups, fluctuation of the off-axis-most meridional curvature of field on the closest side and the far side reaches 0.1 mm or more, indicating insufficient optical performances. In case of using three focus groups, fluctuation of the off-axis-most meridional curvature of field on the closest side and the far side is small, indicating good optical performances. But three focus groups must be moved, thereby increasing the weight of the actuators.

PRIOR ART

[Patent Document 1] JP 2018-97046 A
[Patent Document 2] JP 2019-132904 A

SUMMARY OF THE INVENTION

The present disclosure provides an optical system in which focus adjustment is easy to perform and a focus mechanism can be reduced in size and weight. The present disclosure also provides an image projection apparatus and an imaging apparatus using such an optical system.

Technical Field

An optical system according to the present disclosure internally having an intermediate imaging position that is conjugate with both of a magnification conjugate point on a magnification side and a reduction conjugate point on a reduction side, the optical system comprising:

a first positive lens group including a plurality of lens elements and positioned on the magnification side with respect to the intermediate imaging position;

a second positive lens group including a plurality of lens elements and positioned between the first positive lens group and the intermediate imaging position; and a negative lens group including a plurality of lens elements and positioned on the reduction side with respect to the intermediate imaging position, wherein, during focusing, the first positive lens group and the negative lens group move in an optical axis direction, and the second positive lens group is stationary.

Further, an image projection apparatus according to the present disclosure includes the above-described optical system and an image forming element that generates an image to be projected through the optical system onto a screen.

Still further, an imaging apparatus according to the present disclosure includes the above-described optical system and an imaging element that receives an optical image formed by the optical system to convert the optical image into an electrical image signal.

The present disclosure provides an optical system in which focus adjustment is easy to perform and a focus mechanism can be reduced in size and weight.

BRIEF DESCRIPTION OF THE DRAWINGS

FIGS. 7A-7C are layout diagrams of the zoom lens system according to example 2 for an object distance of 1080 mm.

DETAILED DESCRIPTION

Figure 1:
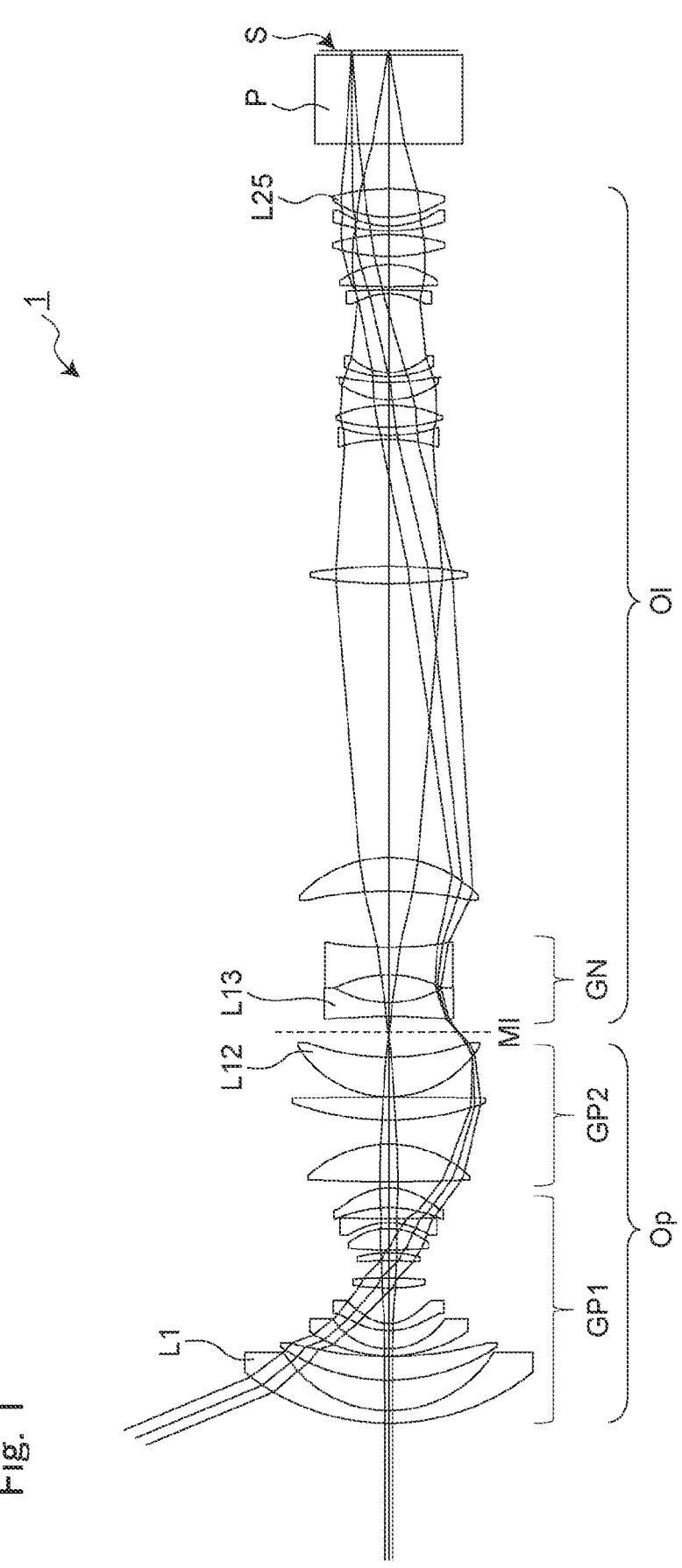
FIG. 1 is a layout diagram showing an optical path at a wide-angle end in a zoom lens system of example 1 for an object distance of 1080 mm.
Figures 2A, 2B, 2C:
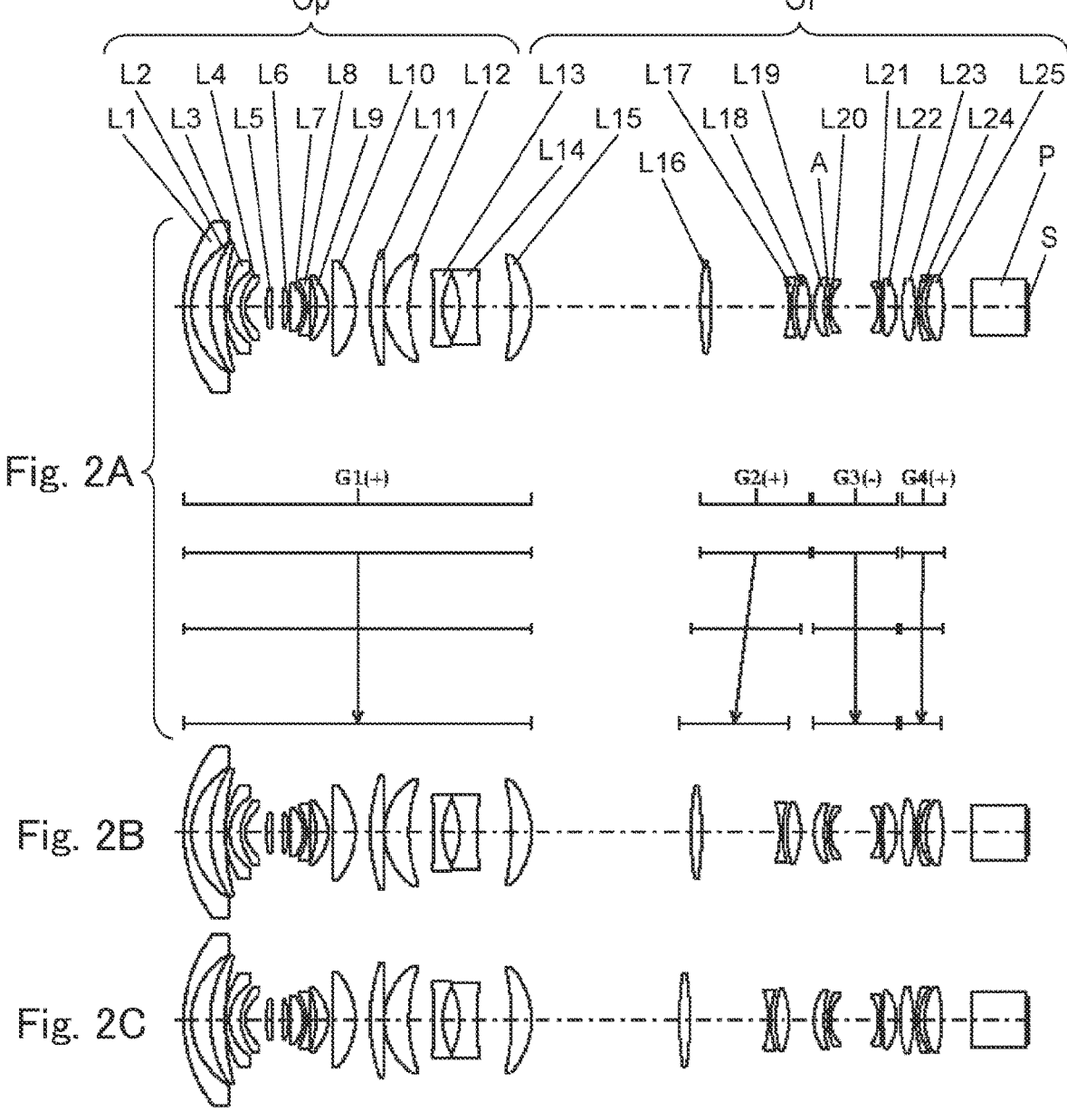
FIGS. 2A-2C are layout diagrams of the zoom lens system according to example 1 for an object distance of 1080 mm.
Figures 3A, 3B, 3C:
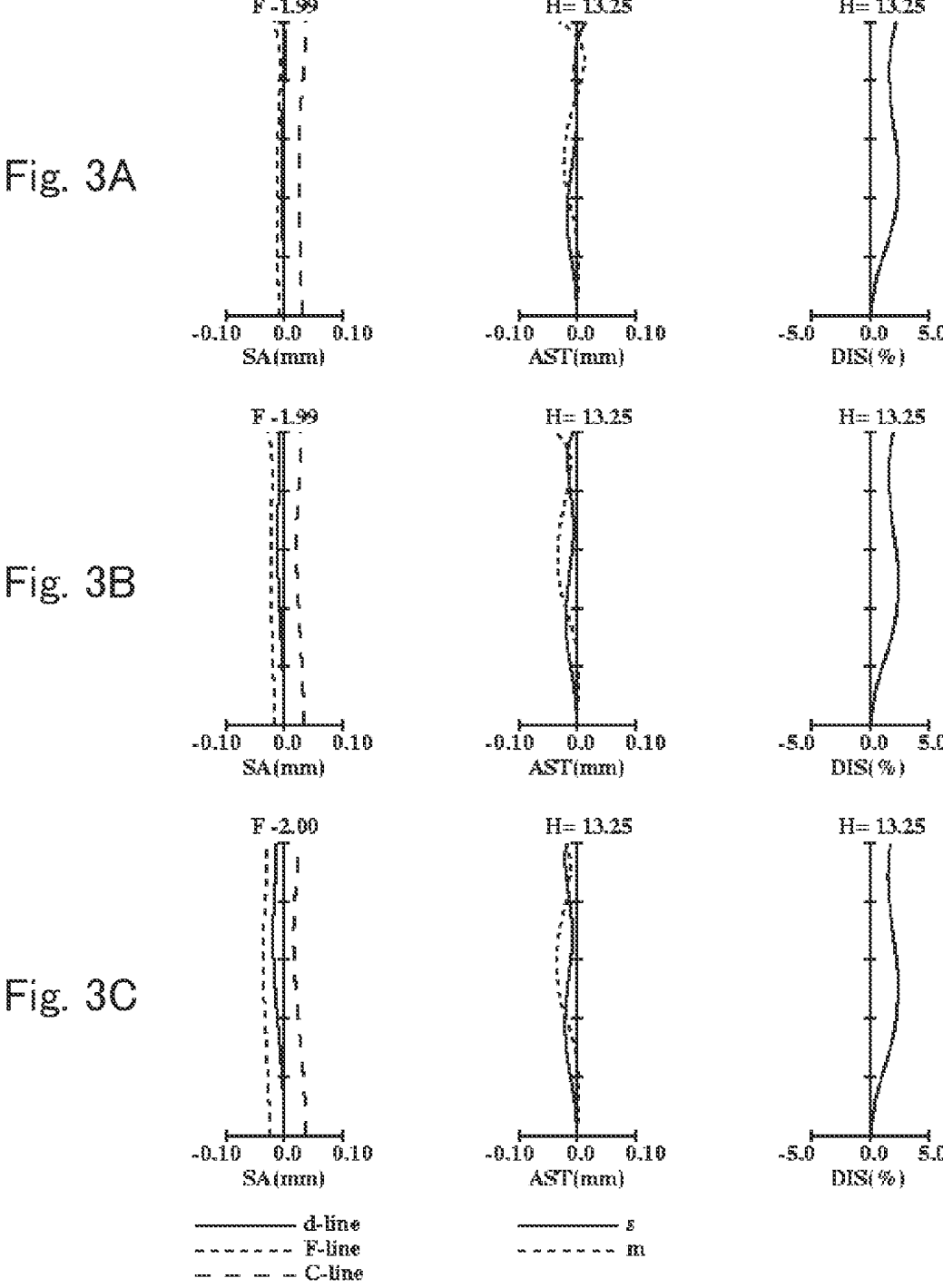
FIGS. 3A-3C are longitudinal aberration diagrams of the zoom lens system according to example 1 for an object distance of 1080 mm.
Figures 4A, 4B, 4C:
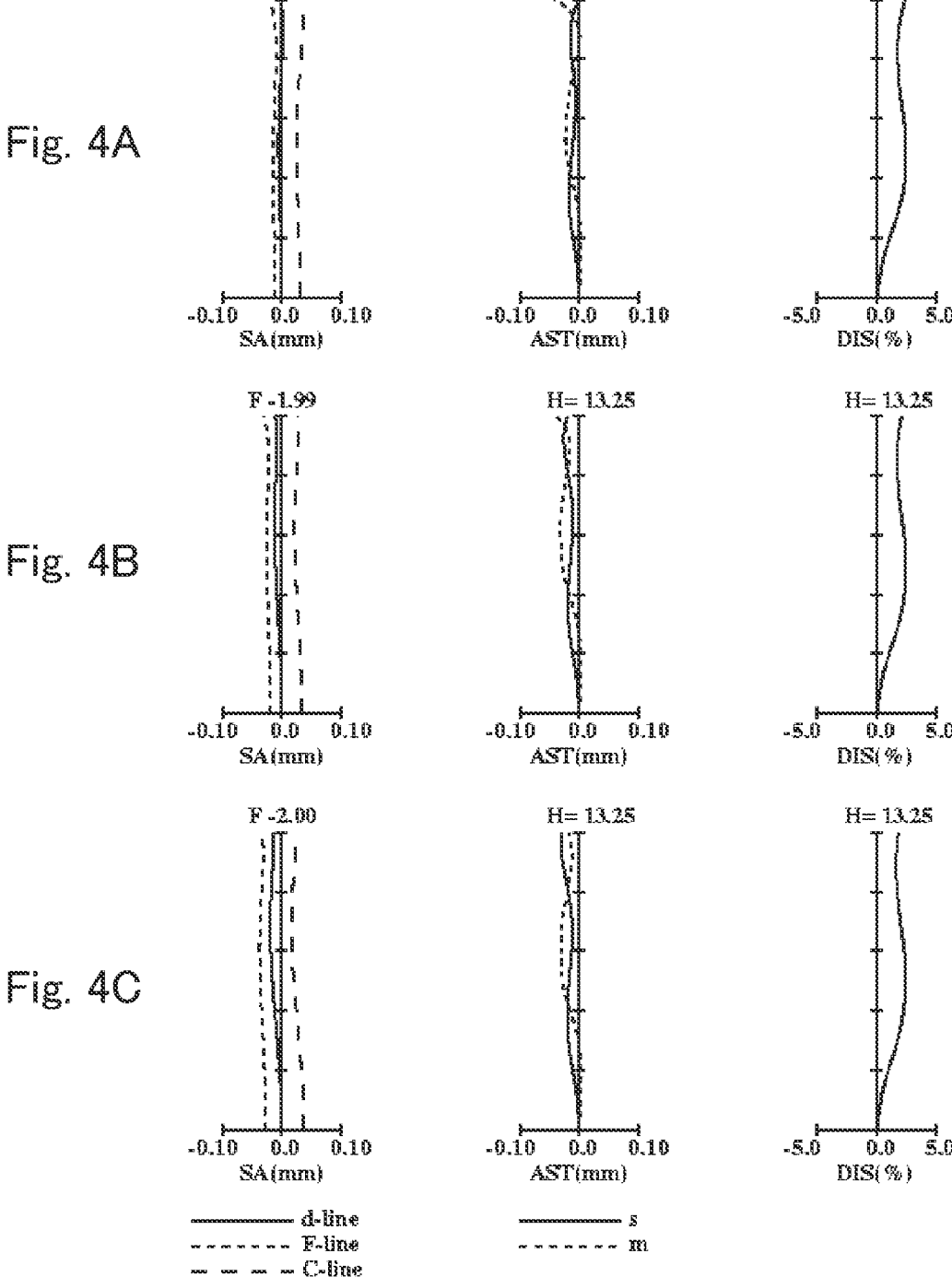
FIGS. 4A-4C are longitudinal aberration diagrams of the zoom lens system according to example 1 for an object distance of 780 mm.
Figures 5A, 5B, 5C:
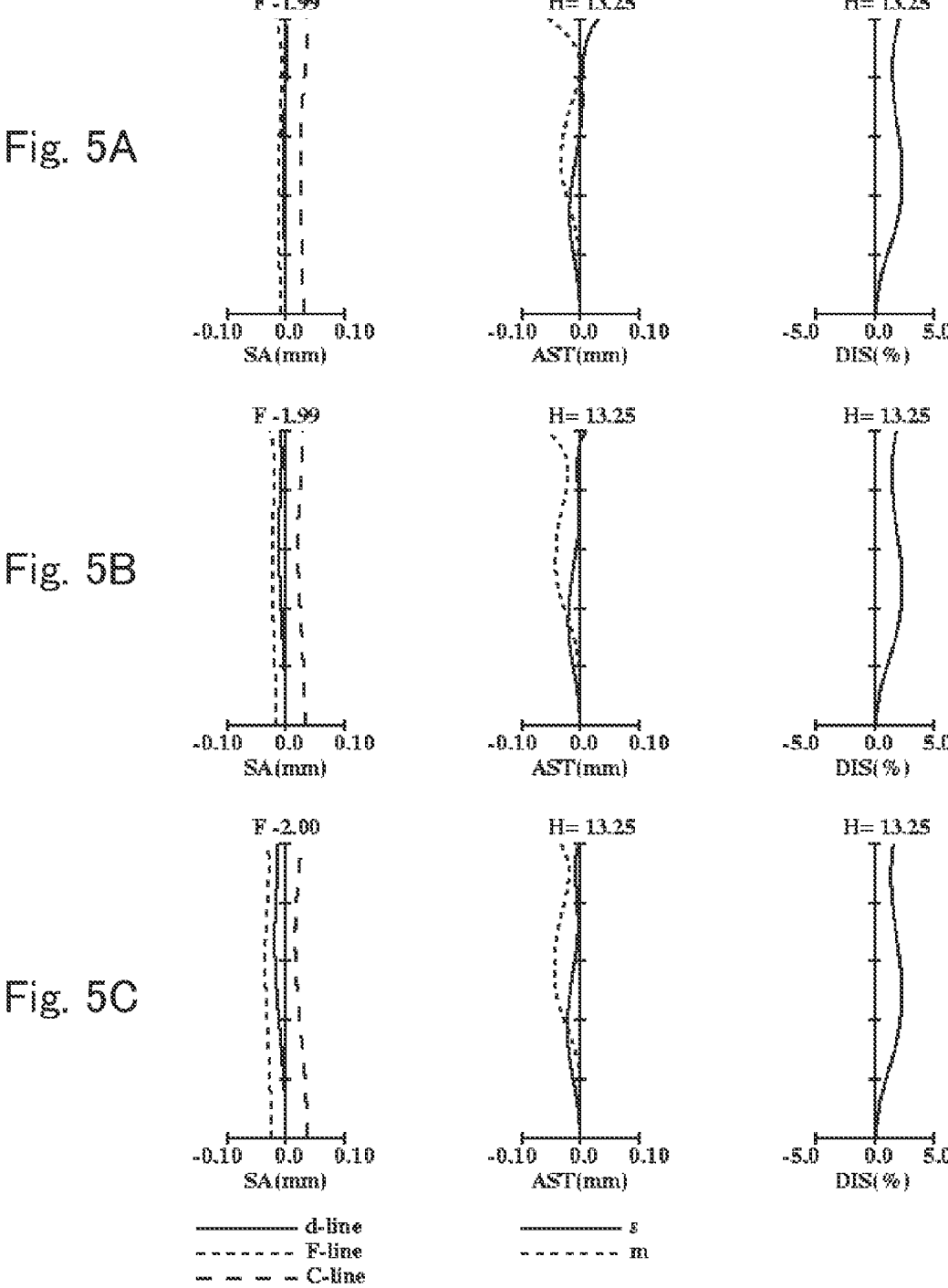
FIGS. 5A-5C are longitudinal aberration diagrams of the zoom lens system according to example 1 for an object distance of 2900 mm.
Figure 6:
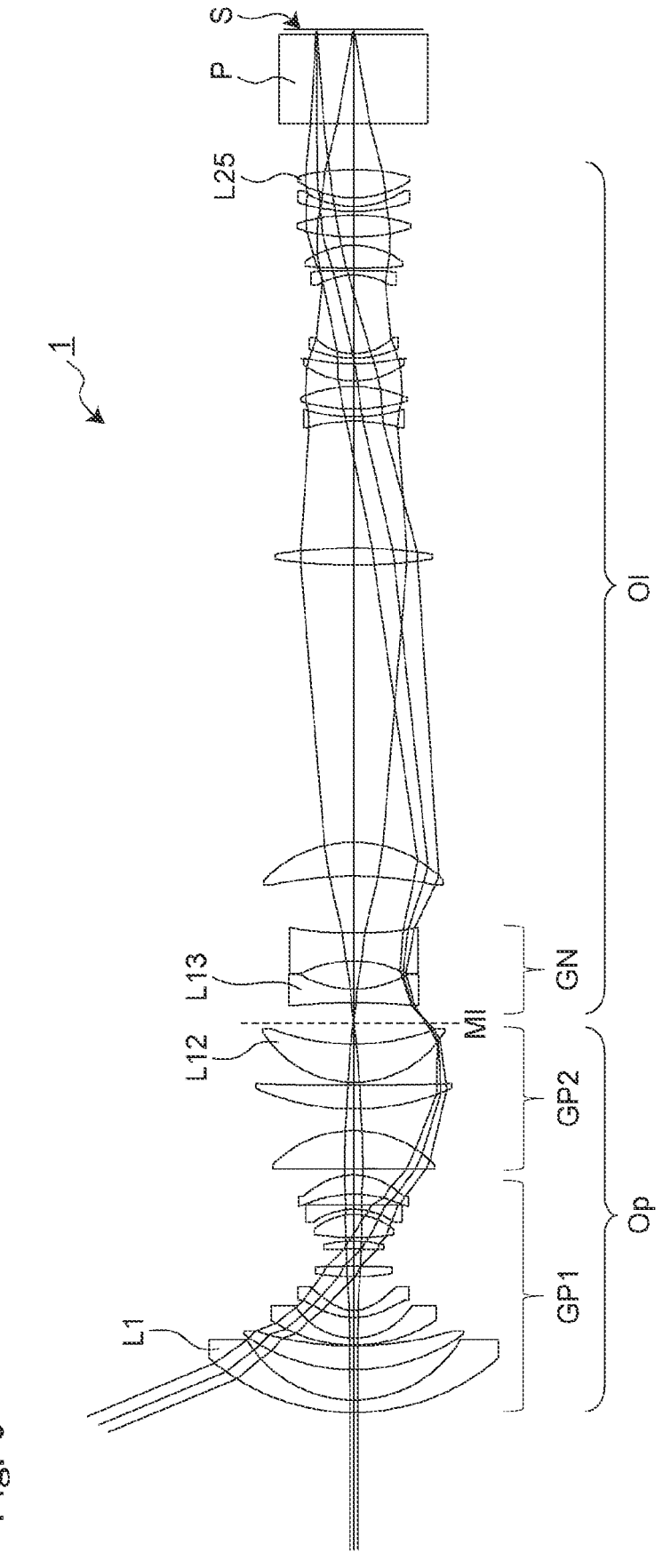
FIG. 6 is a layout diagram showing an optical path at a wide-angle end in a zoom lens system of example 2 for an object distance of 1080 mm.
Figures 8A, 8B, 8C:
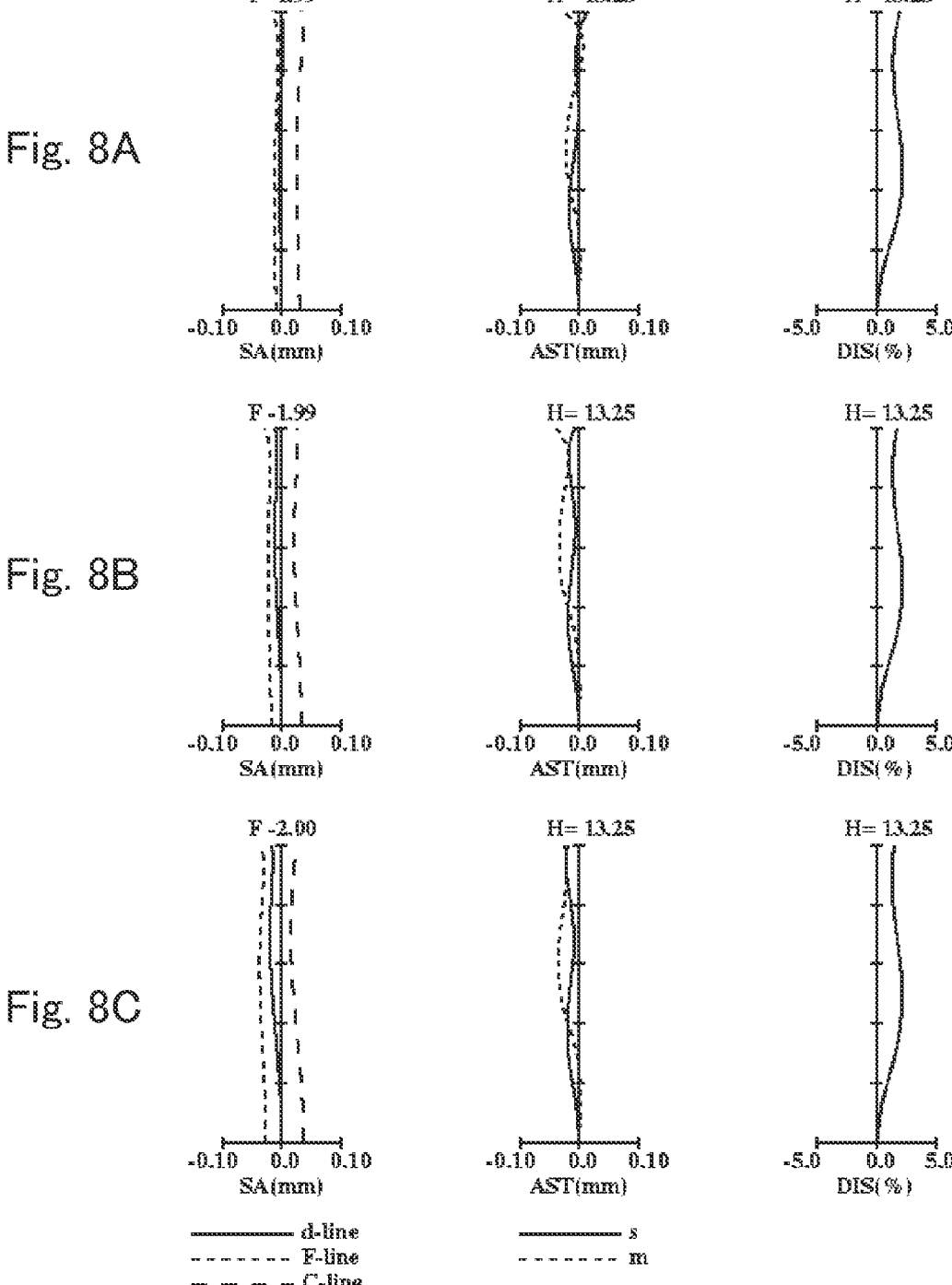
FIGS. 8A-8C are longitudinal aberration diagrams of the zoom lens system according to example 2 for an object distance of 1080 mm.
Figures 9A, 9B, 9C:
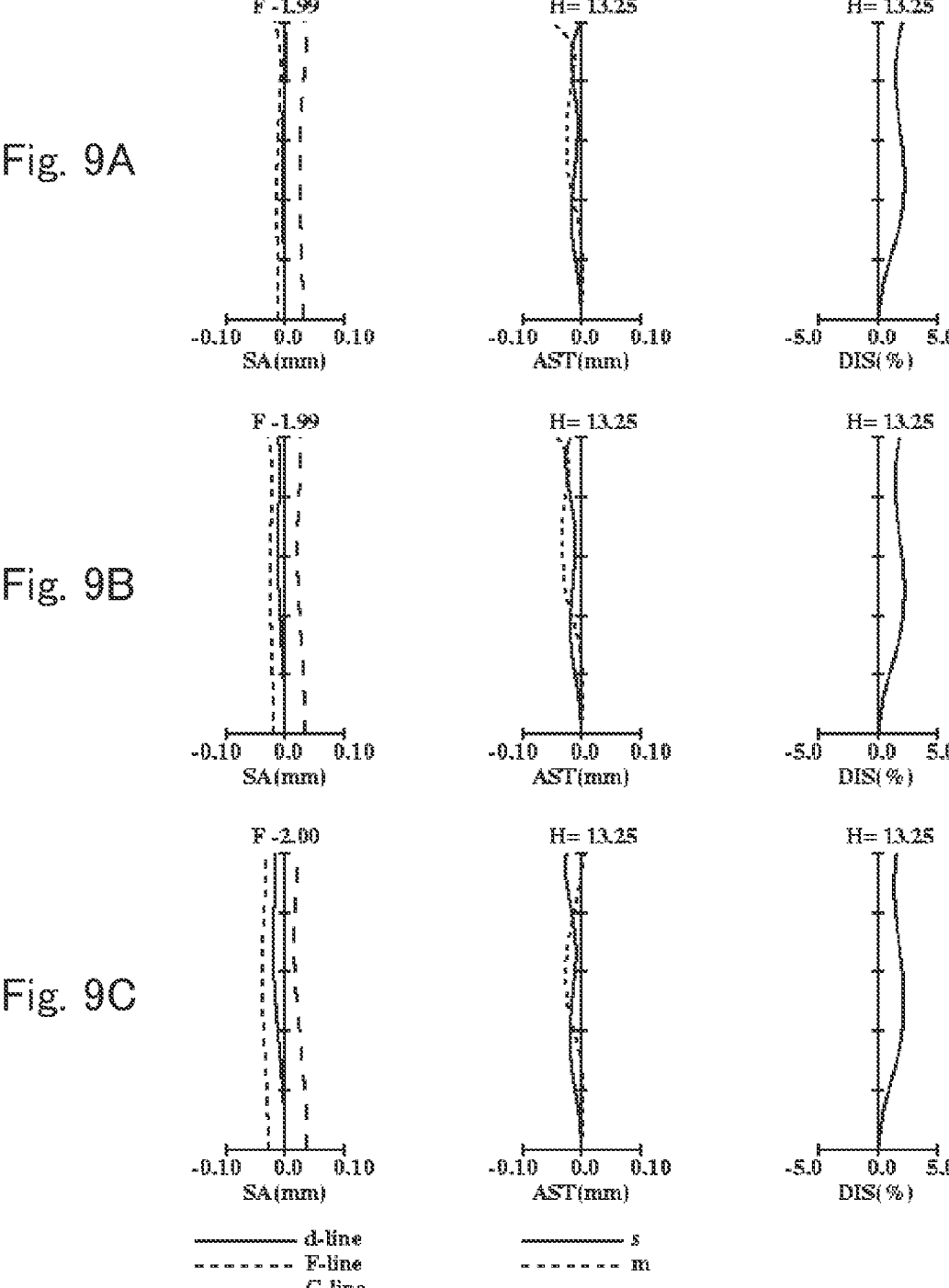
FIGS. 9A-9C are longitudinal aberration diagrams of the zoom lens system according to example 2 for an object distance of 780 mm.
Figures 10A, 10B, 10C:
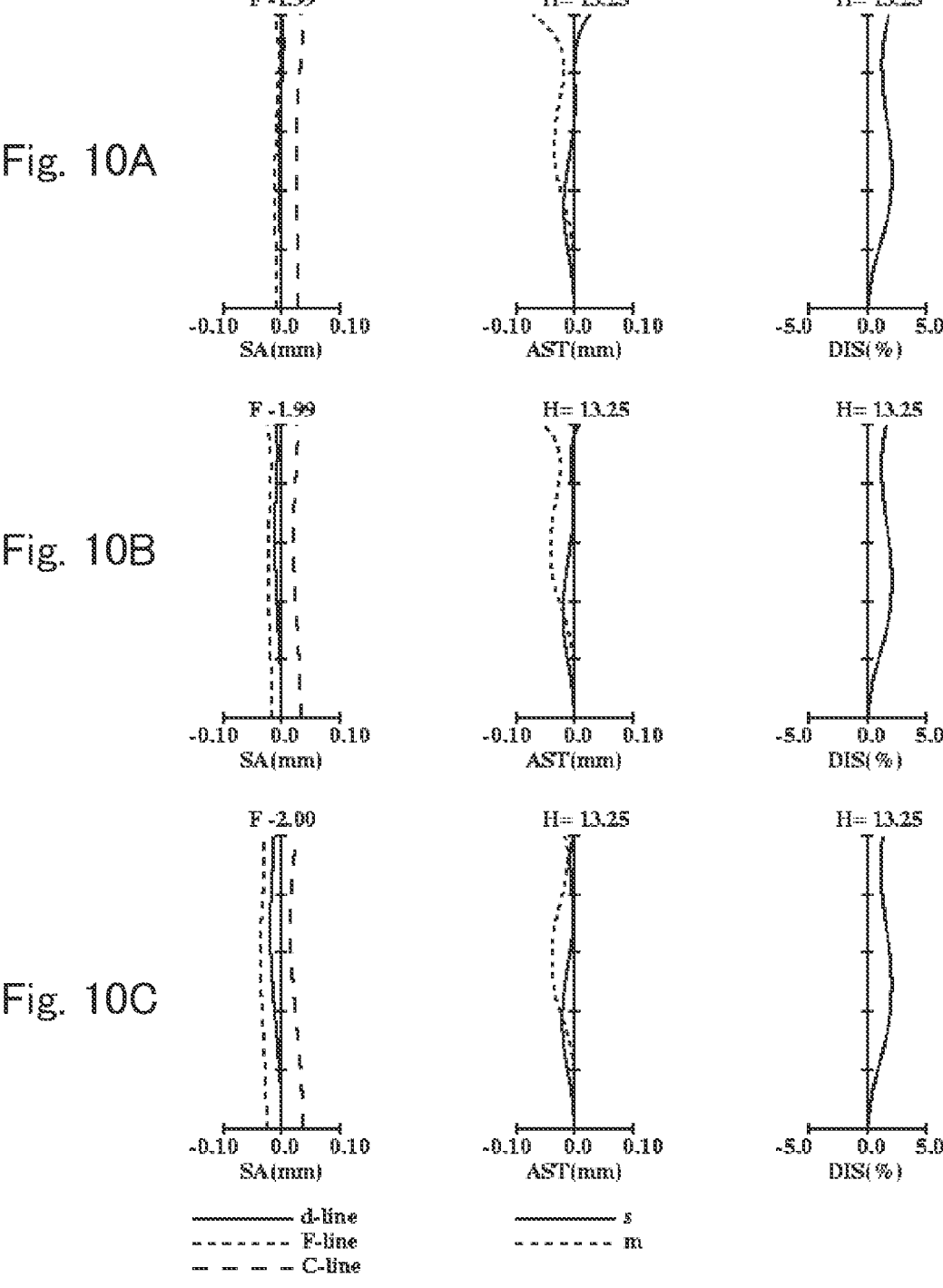
FIGS. 10A-10C are longitudinal aberration diagrams of the zoom lens system according to example 2 for an object distance of 2900 mm.
Figure 11:
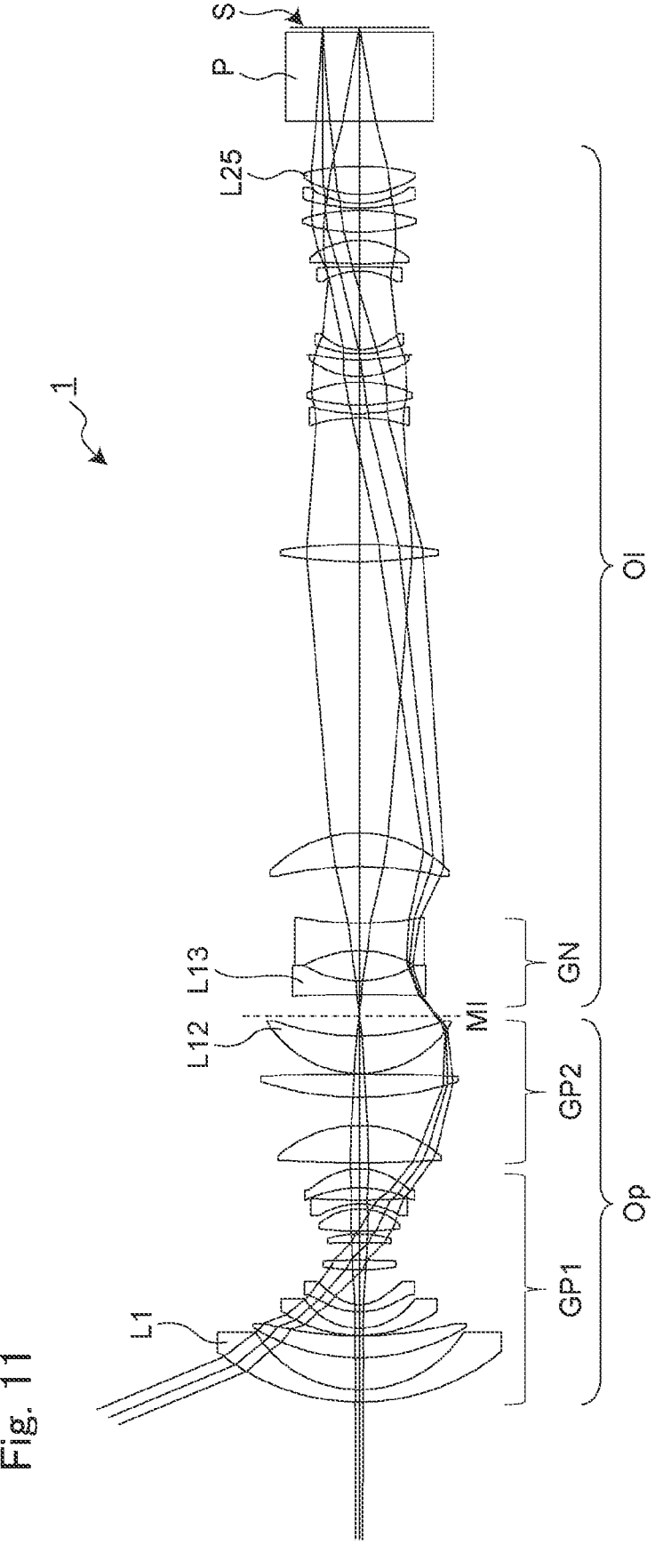
FIG. 11 is a layout diagram showing an optical path at a wide-angle end in a zoom lens system of example 3 for an object distance of 1080 mm.
Figures 12A, 12B, 12C:
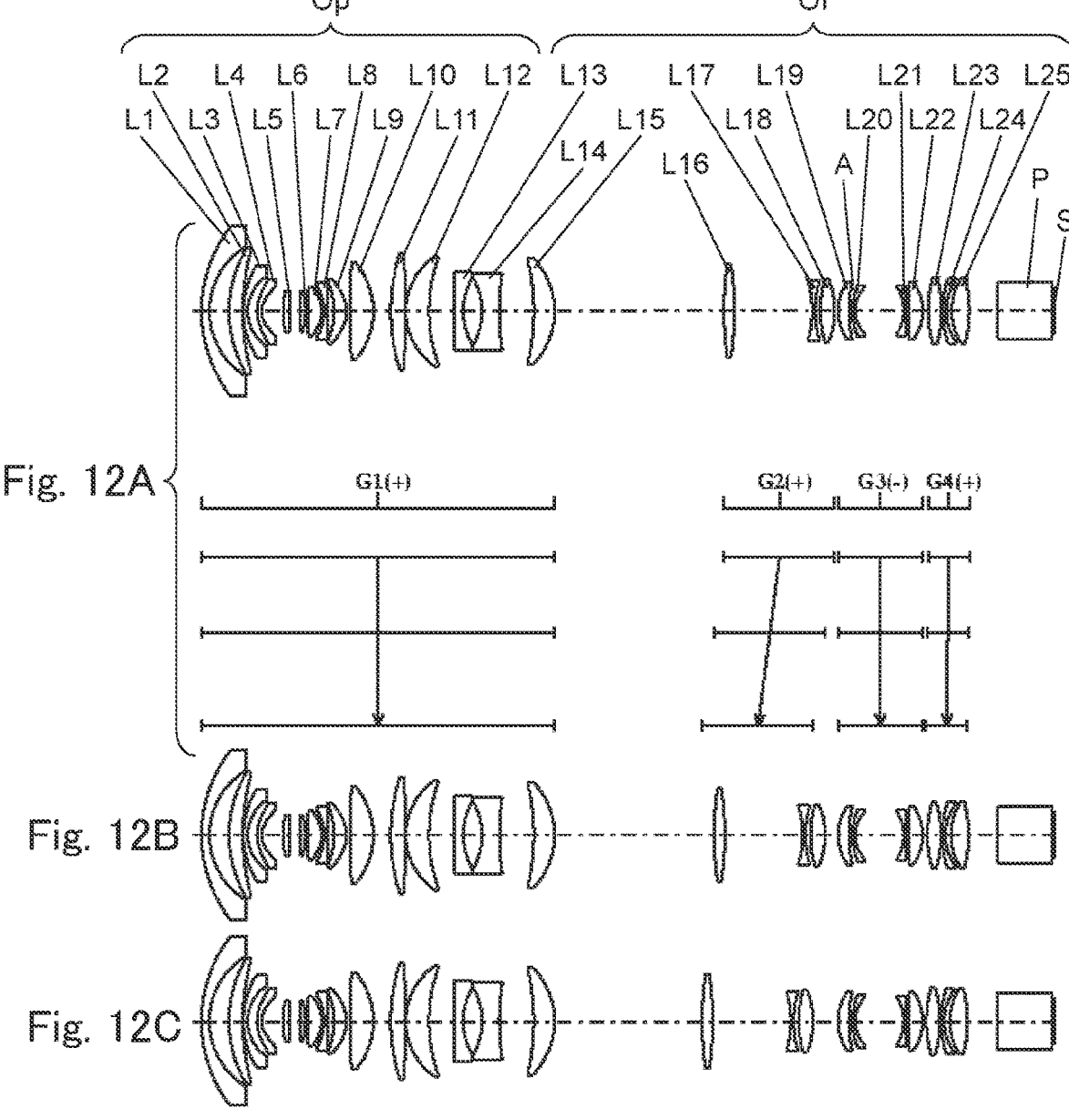
FIGS. 12A-12C are layout diagrams of the zoom lens system according to example 3 for an object distance of 1080 mm.
Figures 13A, 13B, 13C:
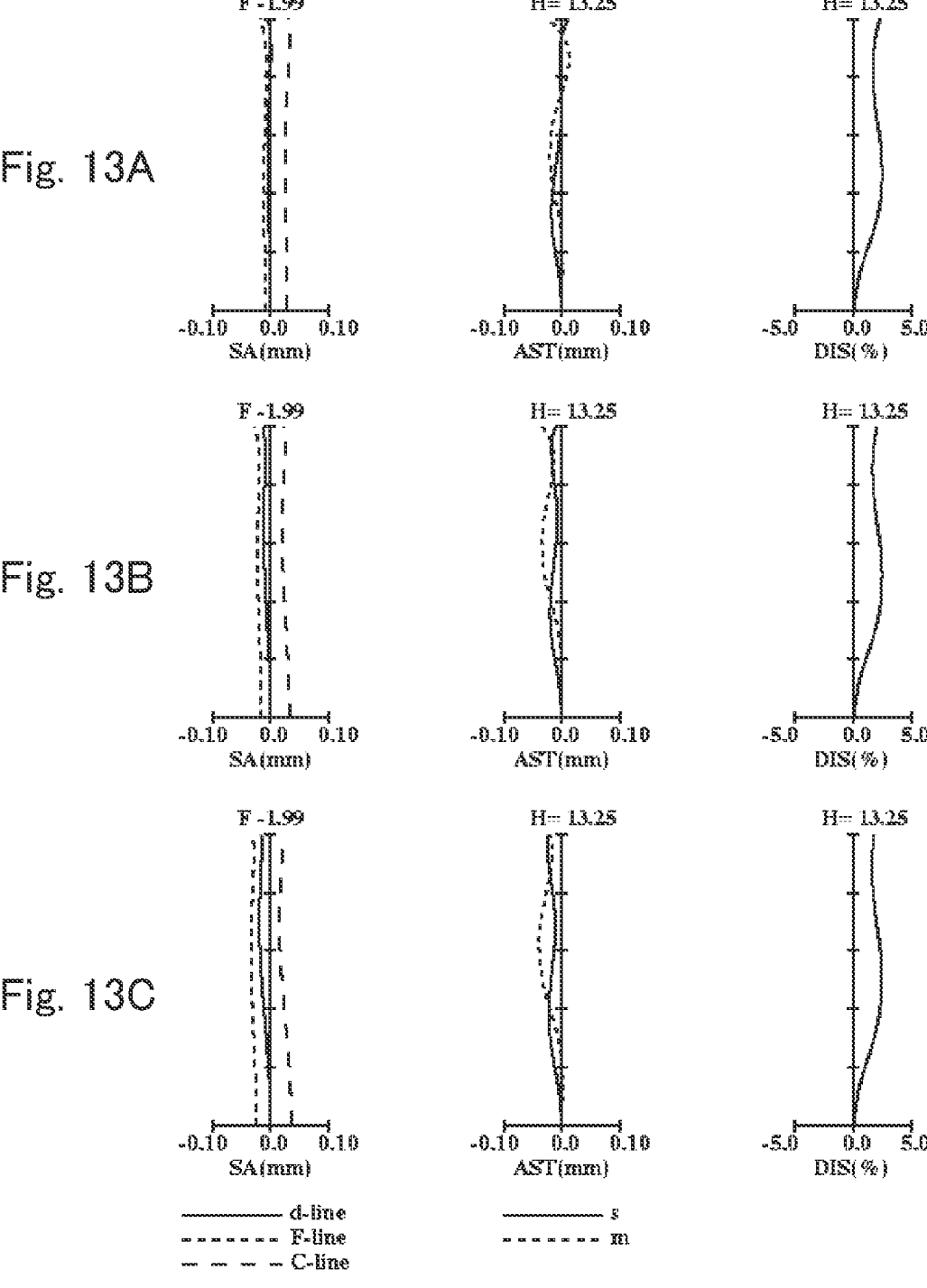
FIGS. 13A-13C are longitudinal aberration diagrams of the zoom lens system according to example 3 for an object distance of 1080 mm.
Figures 14A, 14B, 14C:
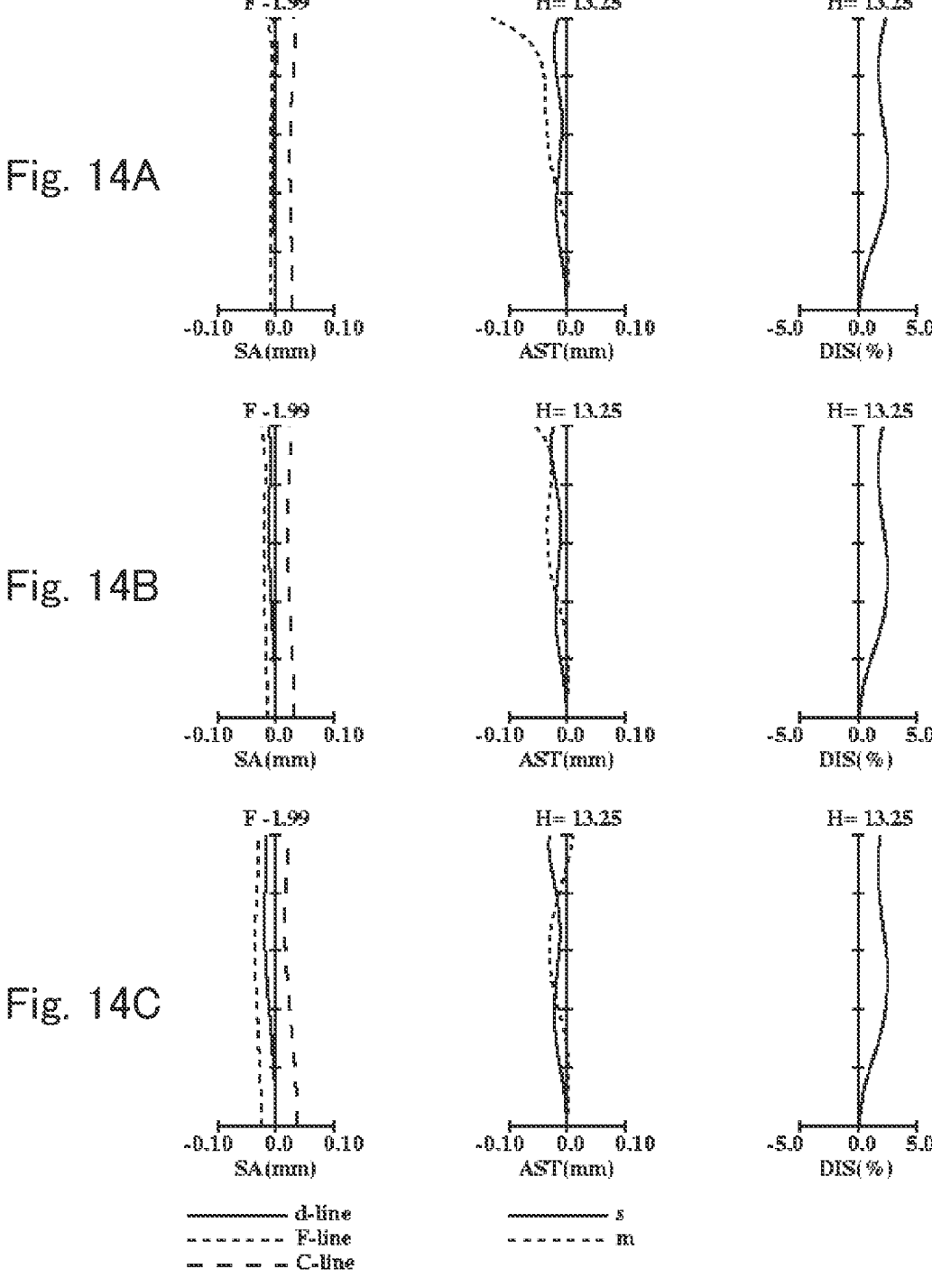
FIGS. 14A-14C are longitudinal aberration diagrams of the zoom lens system according to example 3 for an object distance of 780 mm.
Figures 15A, 15B, 15C:
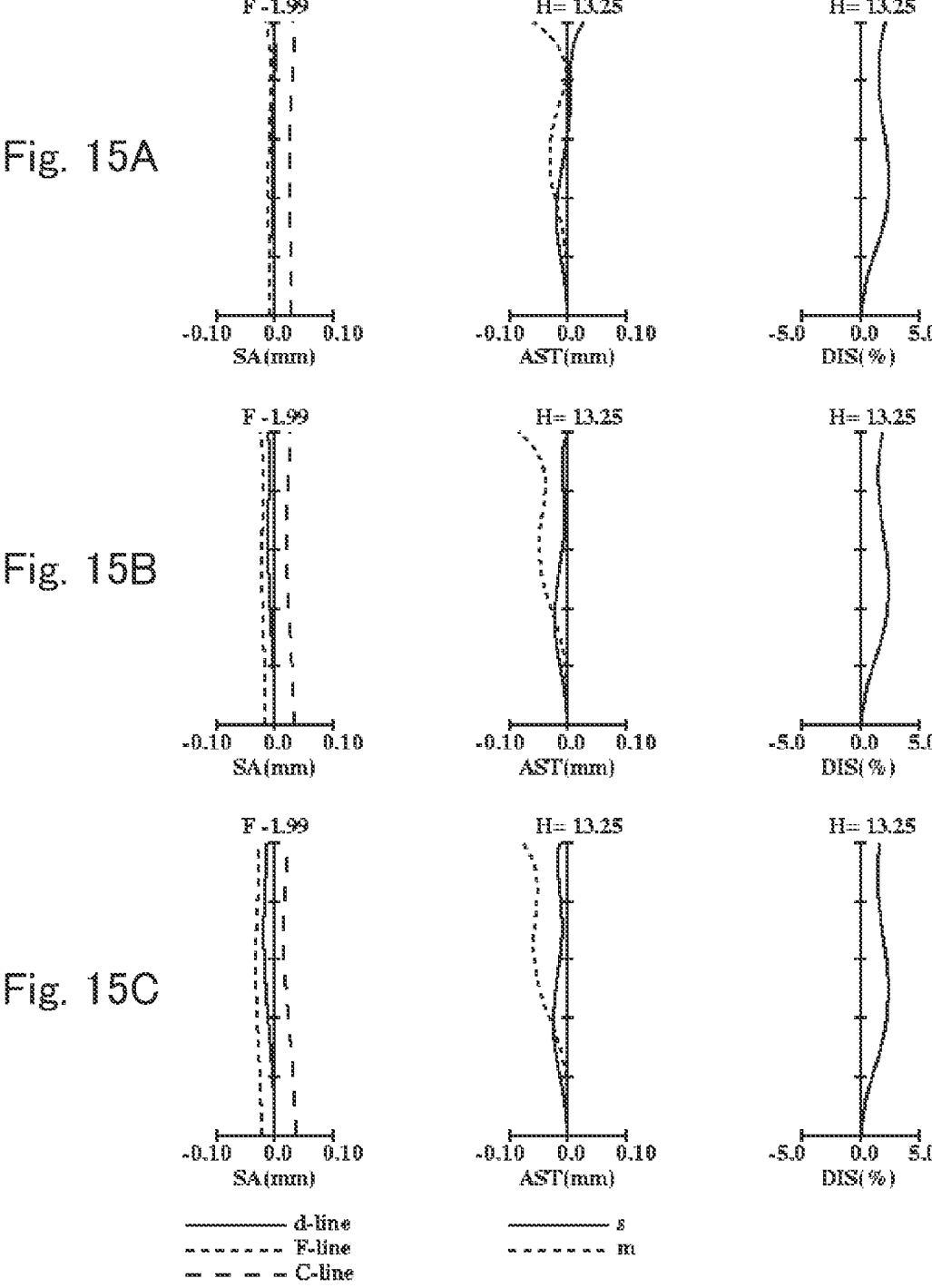
FIGS. 15A-15C are longitudinal aberration diagrams of the zoom lens system according to example 3 for an object distance of 2900 mm.
Figure 16:
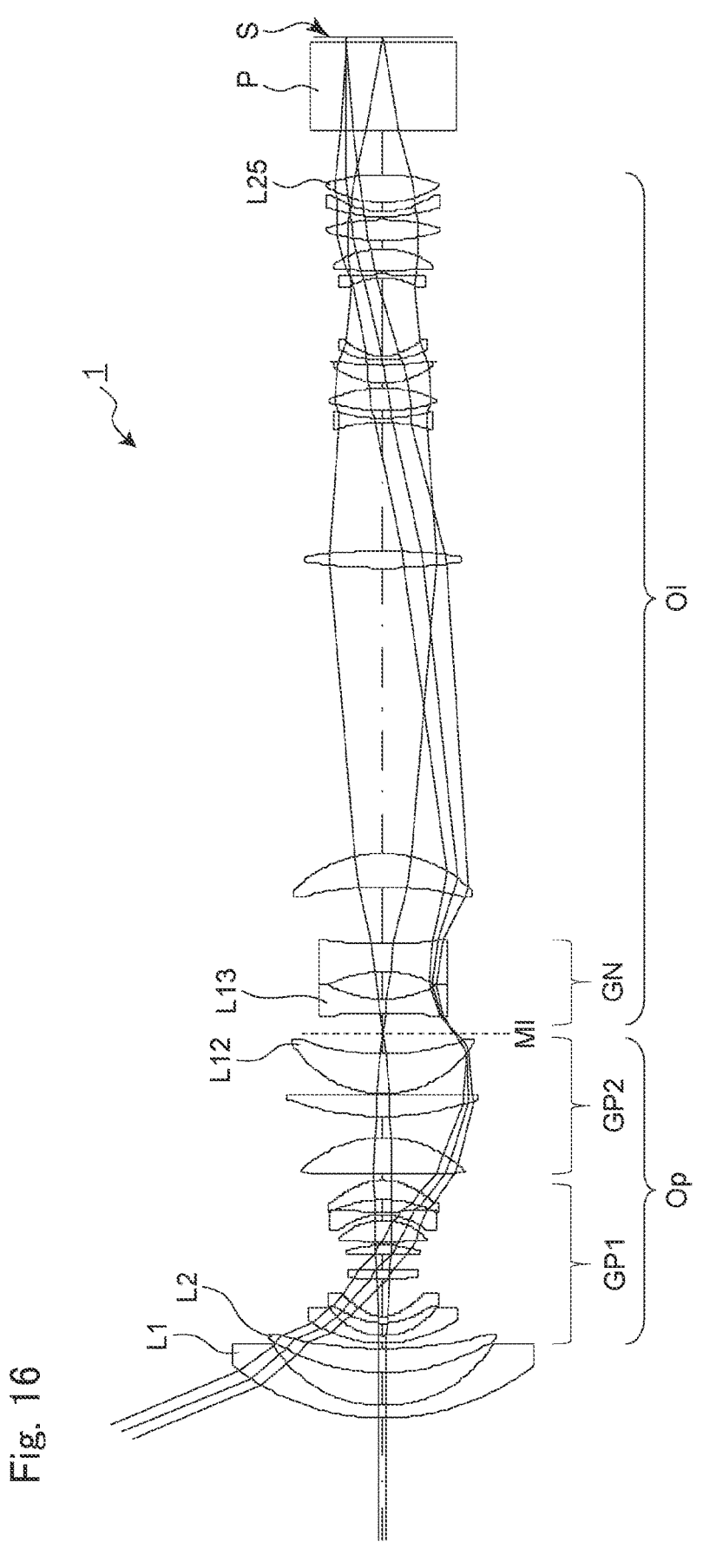
FIG. 16 is a layout diagram showing an optical path at a wide-angle end in a zoom lens system of example 4 for an object distance of 1080 mm.
Figures 17A, 17B, 17C:
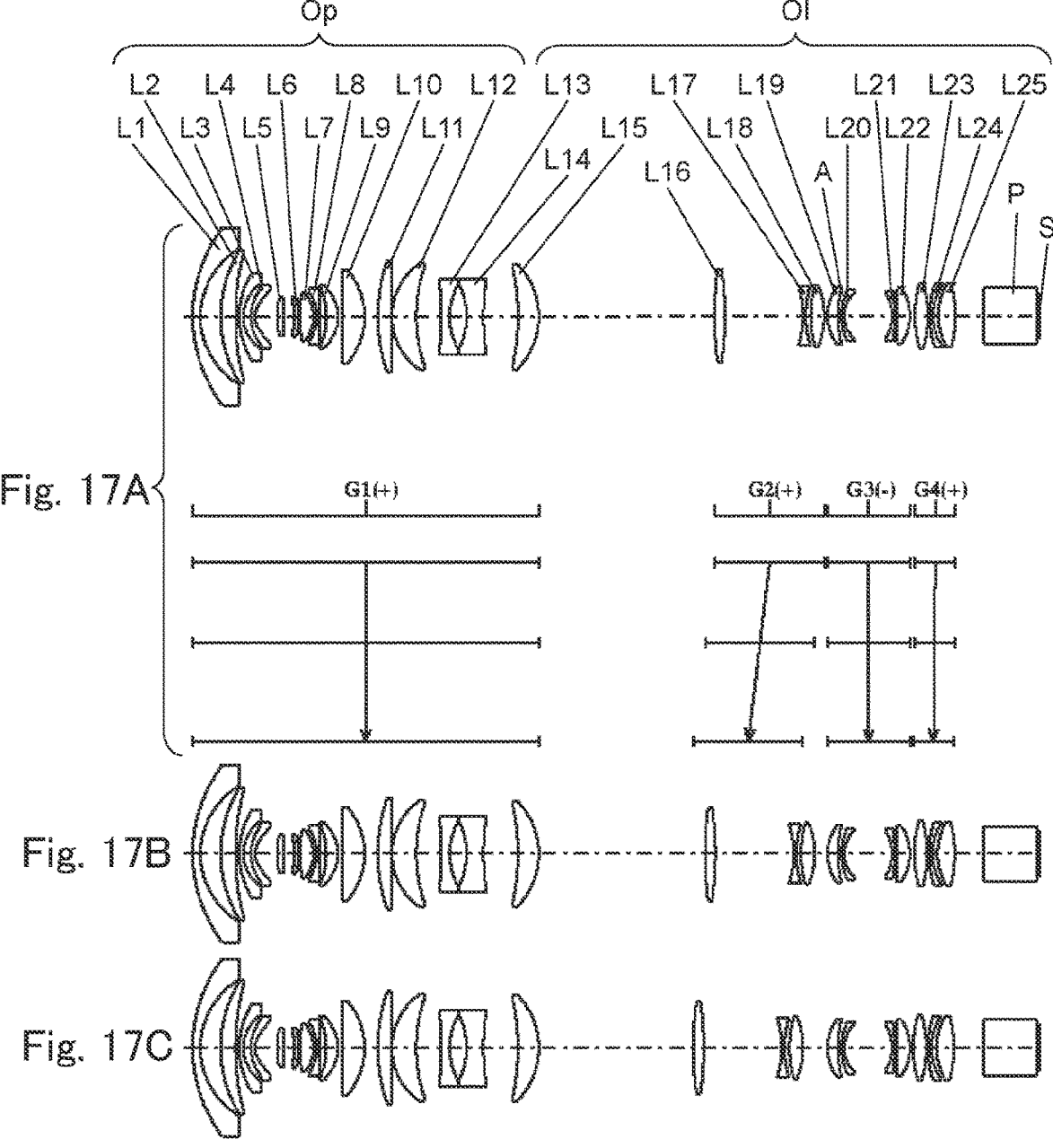
FIGS. 17A-17C are layout diagrams of the zoom lens system according to example 4 for an object distance of 1080 mm.
Figures 18A, 18B, 18C:
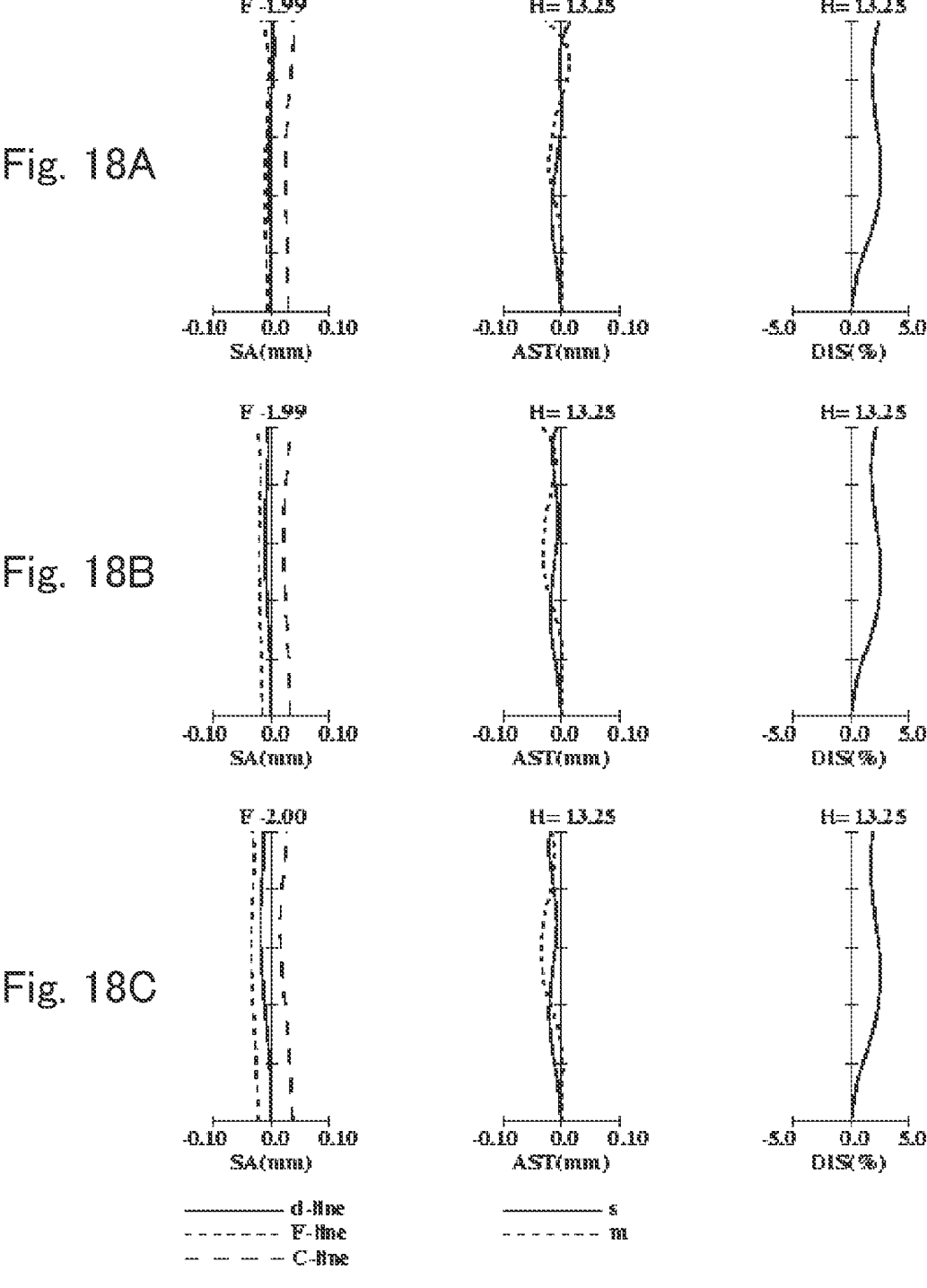
FIGS. 18A-18C are longitudinal aberration diagrams of the zoom lens system according to example 4 for an object distance of 1080 mm.
Figures 19A, 19B, 19C:
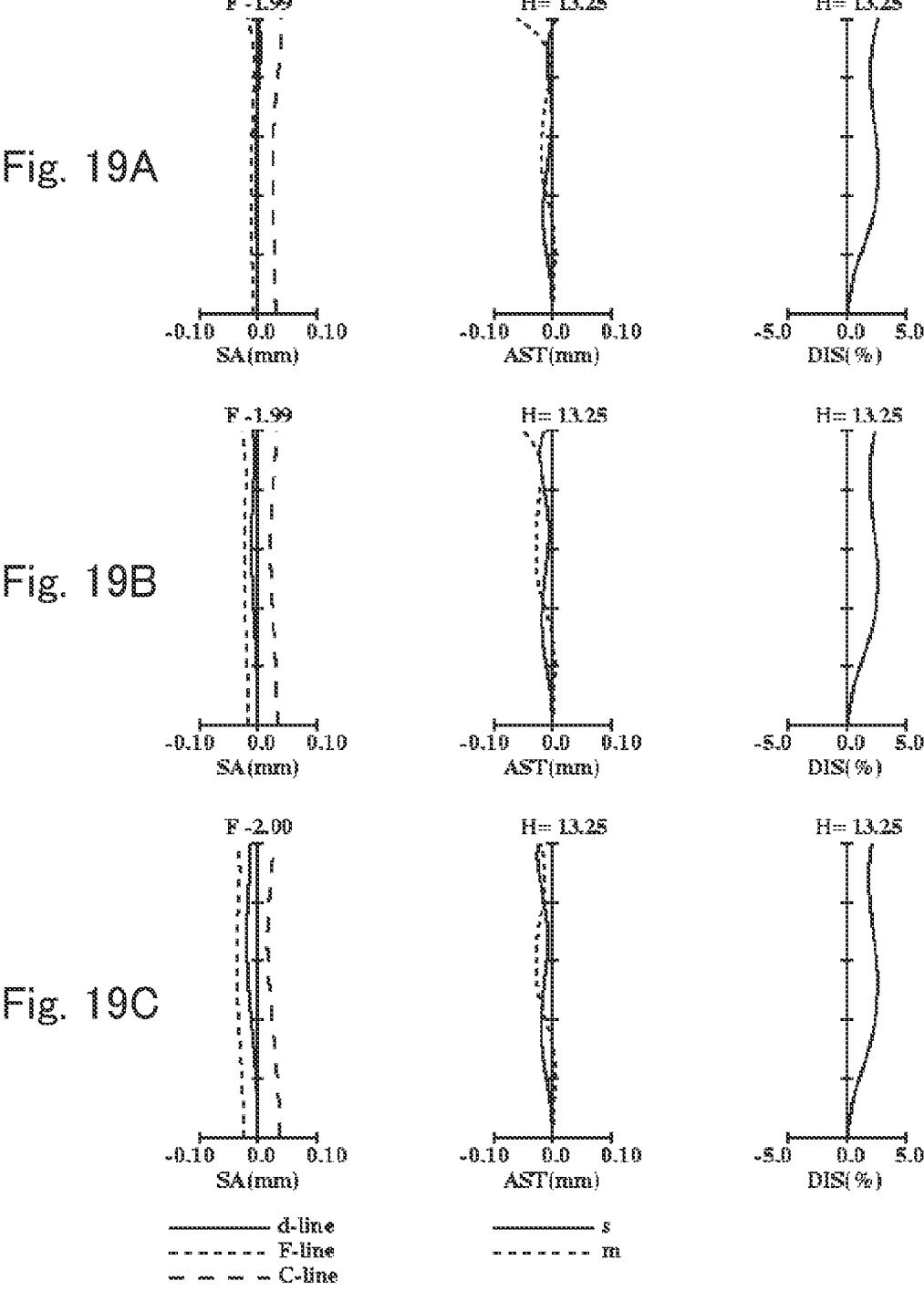
FIGS. 19A-19C are longitudinal aberration diagrams of the zoom lens system according to example 4 for an object distance of 780 mm.
Figures 20A, 20B, 20C:
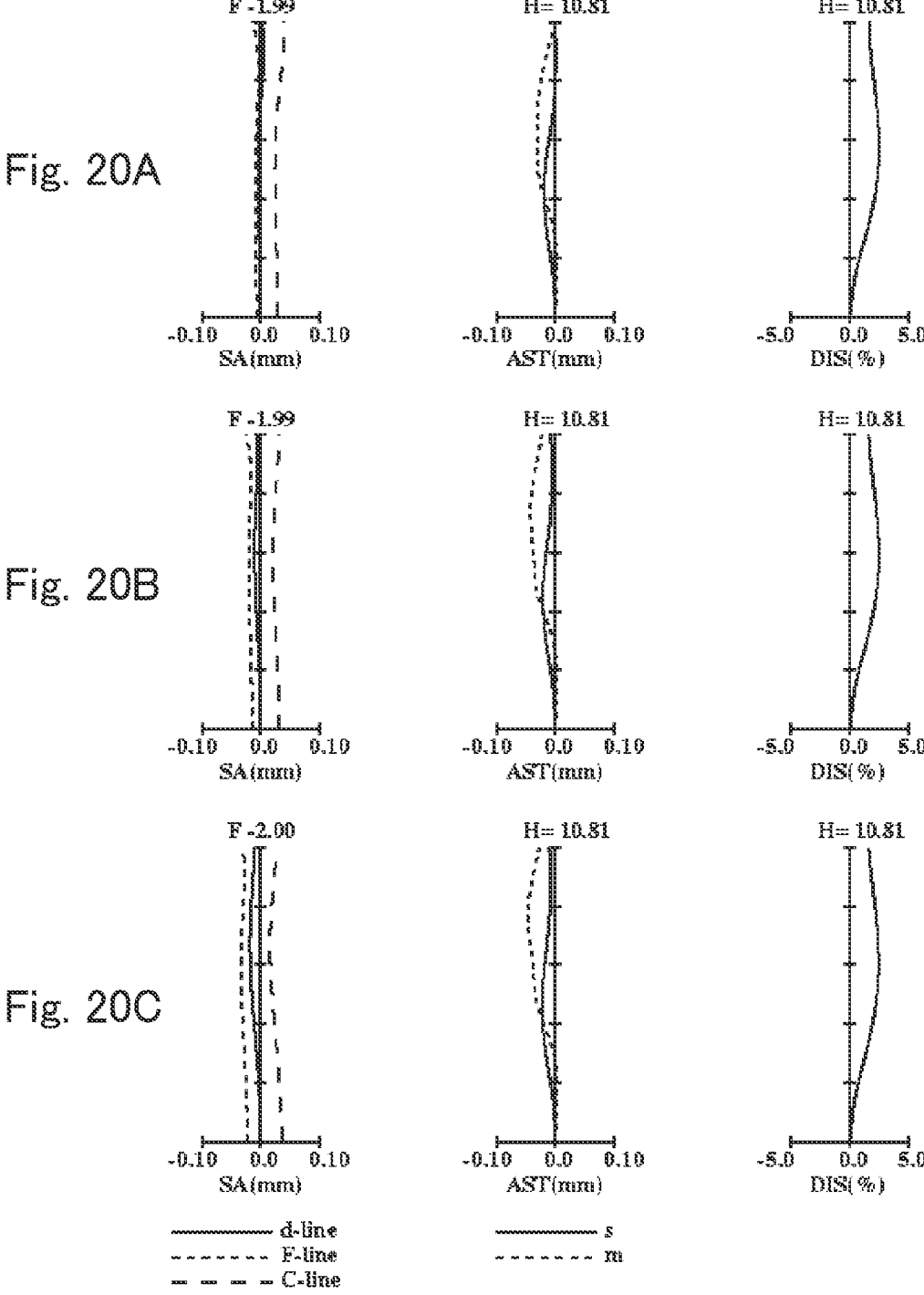
FIGS. 20A-20C are longitudinal aberration diagrams of the zoom lens system according to example 4 for an object distance of 2900 mm.
Figure 21:
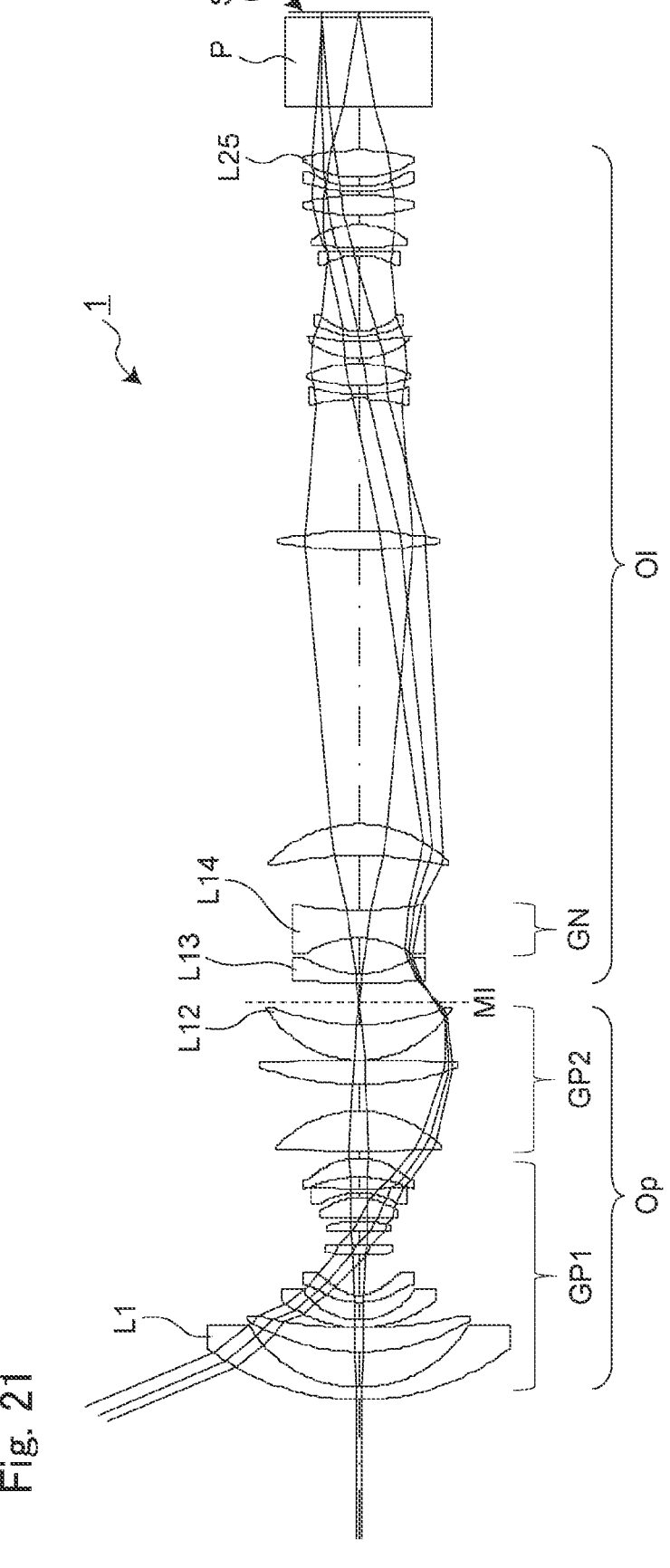
FIG. 21 is a layout diagram showing an optical path at a wide-angle end in a zoom lens system of example 5 for an object distance of 1080 mm.
Figures 22A, 22B, 22C:
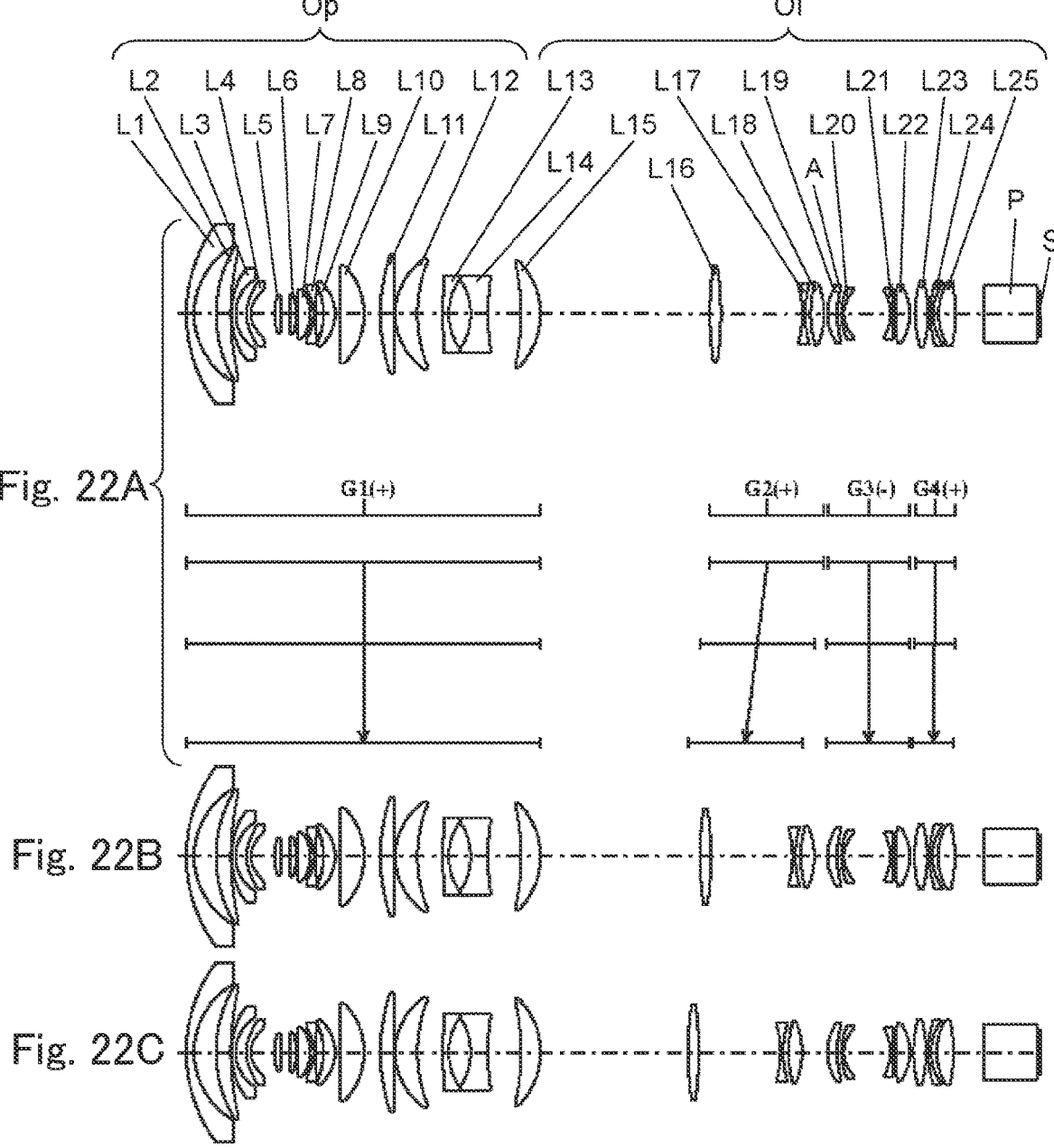
FIGS. 22A-22C are layout diagrams of the zoom lens system according to example 5 for an object distance of 1080 mm.
Figures 23A, 23B, 23C:
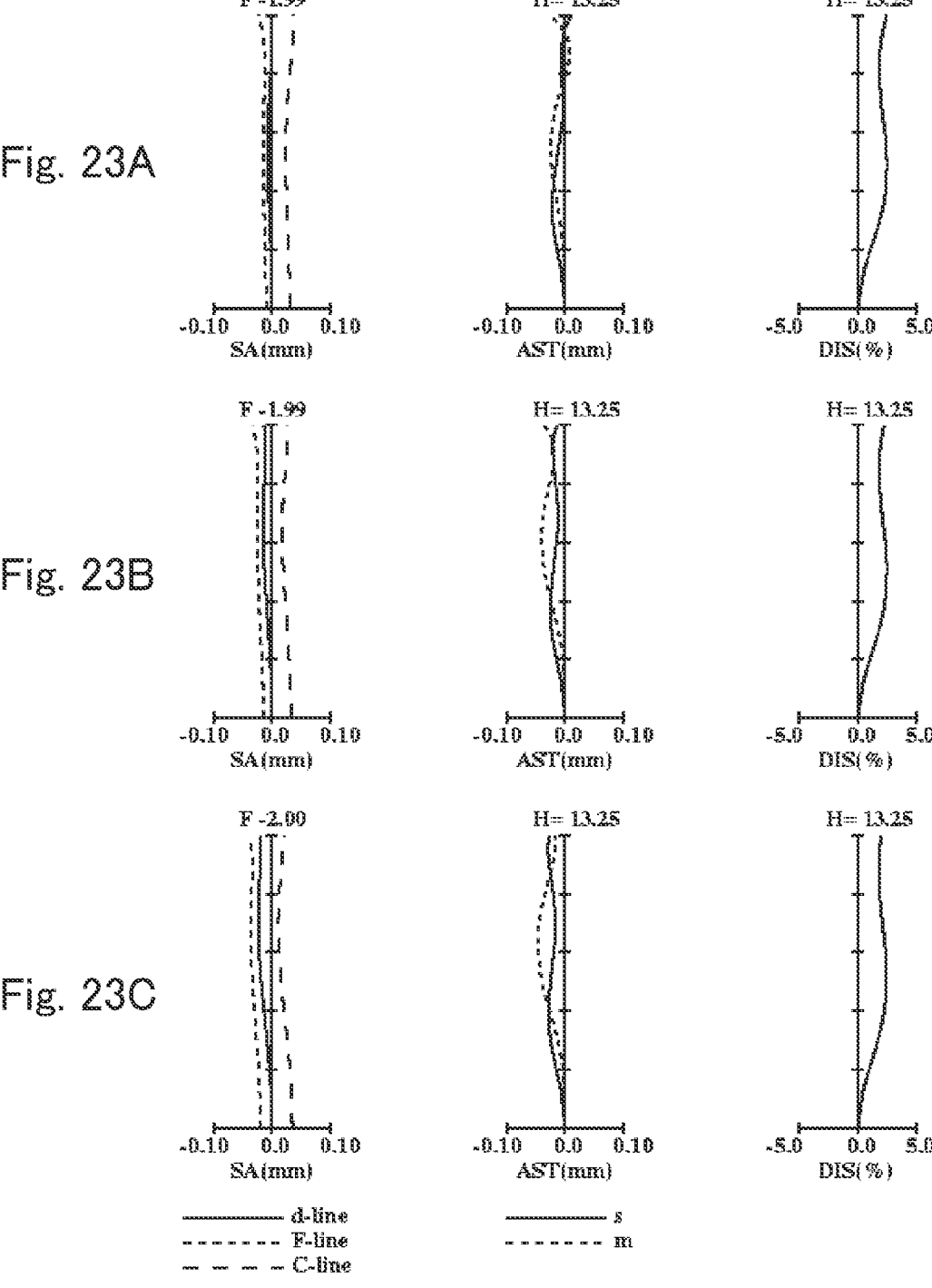
FIGS. 23A-23C are longitudinal aberration diagrams of the zoom lens system according to example 5 for an object distance of 1080 mm.
Figures 24A, 24B, 24C:
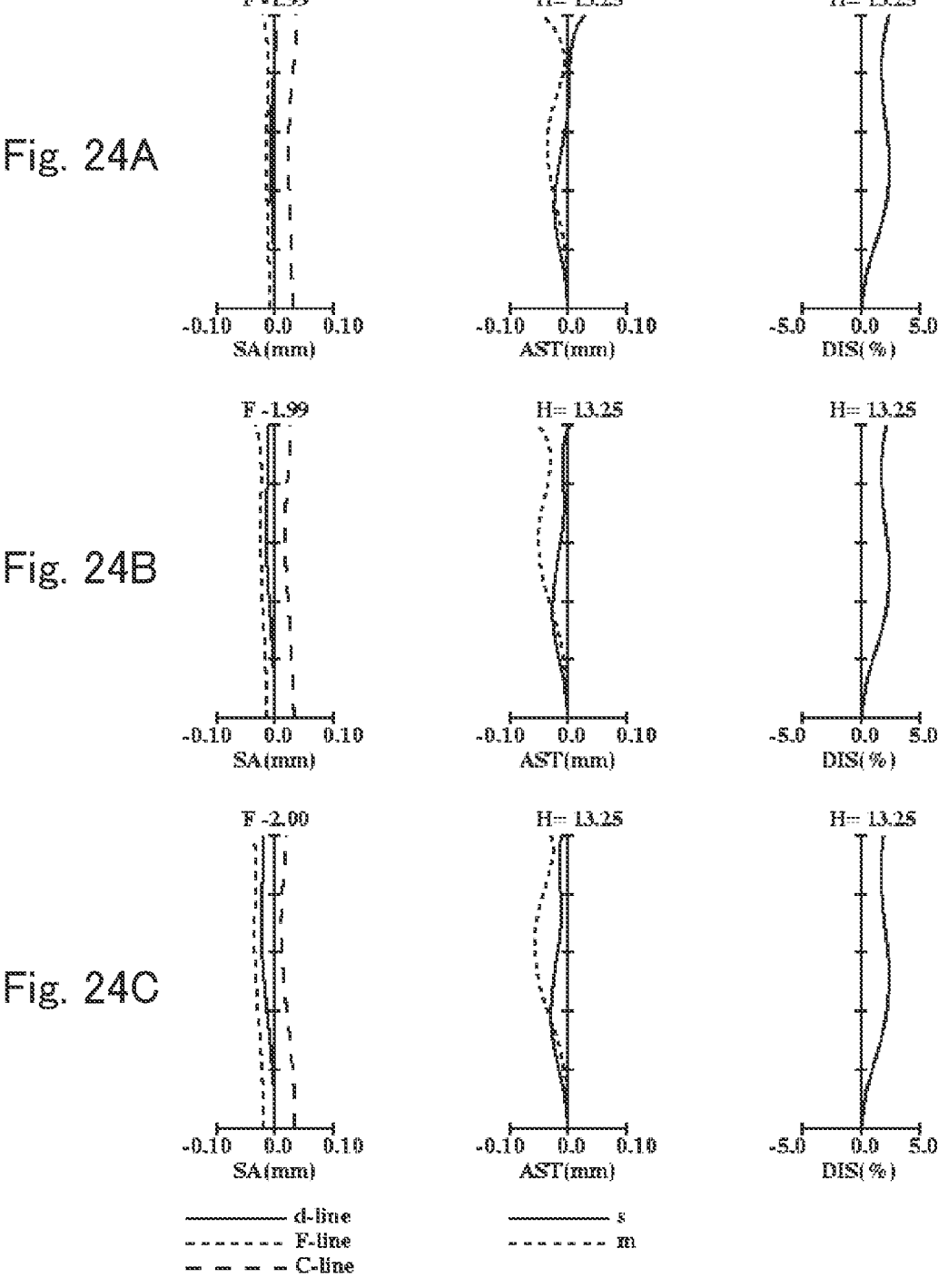
FIGS. 24A-24C are longitudinal aberration diagrams of the zoom lens system according to example 5 for an object distance of 780 mm.
Figures 25A, 25B, 25C:
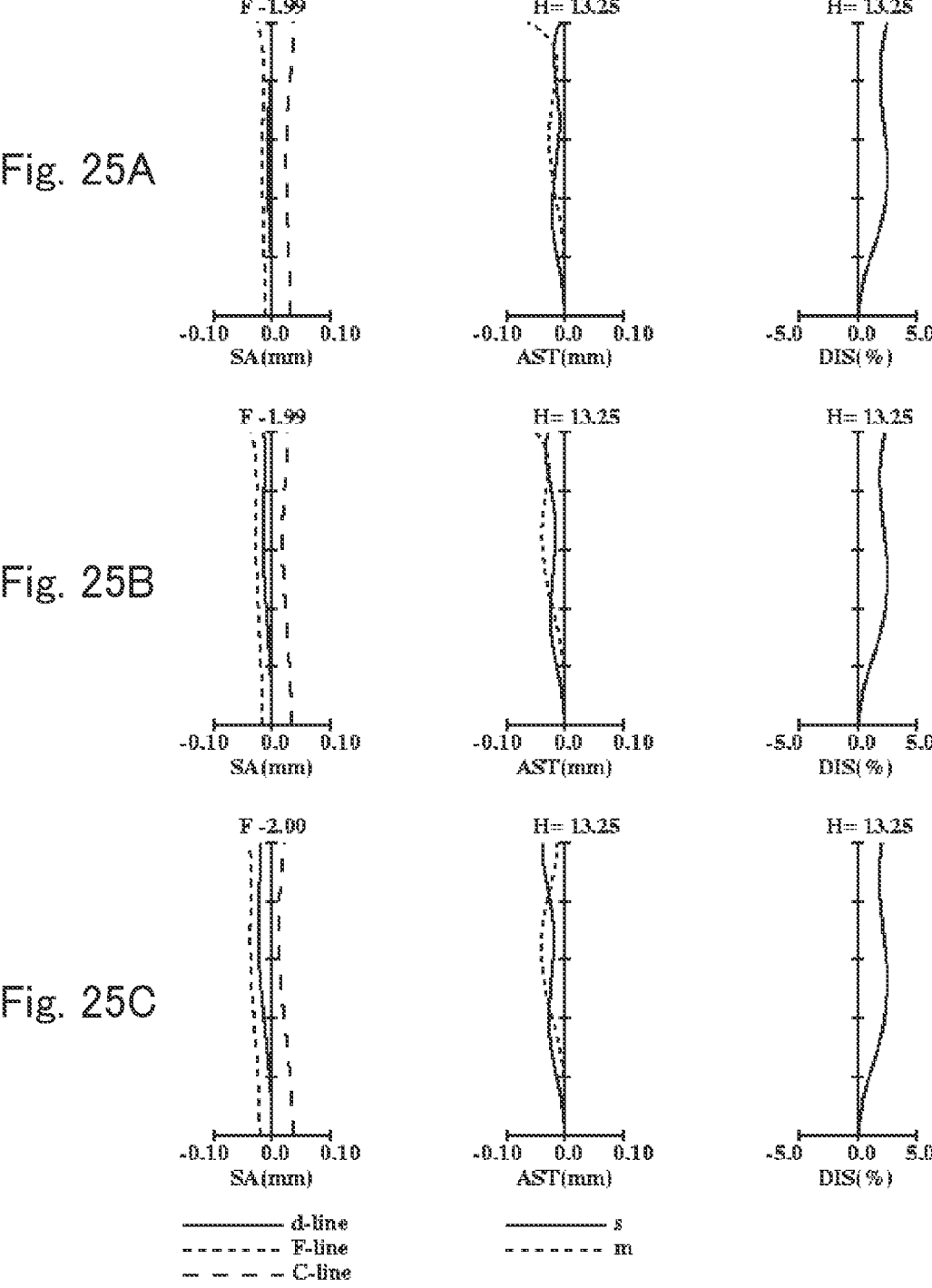
FIGS. 25A-25C are longitudinal aberration diagrams of the zoom lens system according to example 5 for an object distance of 2900 mm.

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image S obtained by spatially modulating incident light using an image forming element, such as liquid crystal or digital micromirror device (DMD), based on an image signal. In other words, the optical system according to the present disclosure can be used for magnifying the original image S on the image forming element arranged on the reduction side to project the image onto the screen (not shown), which is arranged on an extension line on the magnification side.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, a first embodiment of the present disclosure is described with reference to FIGS. 1 to 25. Here, a zoom lens system is described as an example of the optical system.

FIGS. 1, 6, 11, 16, and 21 are layout diagrams each showing an optical path at a wide-angle end in a zoom lens system according to any of examples 1 to 5 for an object distance of 1080 mm. FIGS. 2, 7, 12, 17, and 22 are layout diagrams of the wide-angle end in the zoom lens systems according to examples 1 to 5 for an object distance of 1080 mm. FIGS. 2A, 7A, 12A, 17A, and 22A show lens layout diagrams at the wide-angle end in the zoom lens system. FIGS. 2B, 7B, 12B, 17B, and 22B show lens layout diagrams at an intermediate position in the zoom lens system. FIGS. 2C, 7C, 12C, 17C, and 22C show lens layout diagrams at a telephoto end in the zoom lens system.

The wide-angle end is defined as the shortest focal length state in which the entire optical system has the shortest focal length fw. The intermediate position is defined as an intermediate focal length state between the wide-angle end and the telephoto end. The telephoto end is defined as the longest focal length state in which the entire optical system has the longest focal length ft. By using the focal length fw at the wide-angle end and the focal length ft at the telephoto end, the focal length fm at the intermediate position can be defined as $fm=\sqrt{(fw \times ft)}$ ($\sqrt{}$: square root).

The zoom lens systems according to examples 1 to 5 internally include an intermediate imaging position MI that is conjugate with both of a magnification conjugate point on the magnification side and a reduction conjugate point on the reduction side. A magnification optical system Op is arranged on the magnification side with respect to the intermediate imaging position MI, and a relay optical system O1 is arranged on the reduction side with respect to the intermediate imaging position MI. An optical element P is arranged on the reduction side with respect to the relay optical system O1.

Regarding the zooming function, the zoom lens systems according to examples 1 to 5 include a first lens group G1 to a fourth lens group G4 that are movable independently of one another. By way of example, the first lens group G1 has a positive power, and is constituted of a first lens element L1 to a 15th lens element L15, including a surface 1 to a surface 30 (for surface numbers, see numerical examples described later). The second lens group G2 has a positive power, and is constituted of a 16th lens element L16 to an 18th lens element L18, including a surface 31 to a surface 36. The third lens group G3 has a negative power, and is constituted of a 19th lens element L19 to a 22nd lens element L22, including a surface 37 to a surface 45. The fourth lens group G4 has a positive power, and is constituted of a 23rd lens element L23 to a 25th lens element L25, including a surface 46 to a surface 51. The optical element P includes a surface 52 and a surface 53.

The polygonal line arrows shown in lower part of each FIGS. 2A, 7A, 12A, 17A, and 22A include straight lines obtained by connecting the positions of the first lens group G1 to the fourth lens group G4 corresponding to each of the states of the wide-angle end, the intermediate position, and the telephoto end ranked in order from the top in the drawings. The wide-angle end and the intermediate position, and the intermediate position and the telephoto end are simply connected by a straight line, which is different from the actual movement of each of the lens groups G1 to G4. The symbols (+) and (−) attached to the reference numerals of the respective lens groups G1 to G4 indicate the positive or negative power of each of the lens groups G1 to G4.

Regarding the focus function, the zoom lens systems according to examples 1 to 5 may include, as necessary, a focus lens group that performs focus adjustment when an object distance is changed, and a field curvature correction lens group that corrects field curvature aberration after the focus lens group performs focus adjustment.

By way of example, the zoom lens systems according to examples 1 to 5 include a first positive lens group GP1 having a positive power, a second positive lens group GP2 having a positive power, and a negative lens group GN having a negative power. During focusing, the first positive lens group GP1 and the negative lens group GN move independently of each other in the optical axis direction, and the second positive lens group GP2 is stationary. At this time, the first positive lens group GP1 can function as the field curvature correction lens group described above, and the negative lens group GN can function as the focus lens group described above.

In each of the drawing, an imaging position on the magnification side (i.e., the magnification conjugate point) is positioned on the left side, and an imaging position on the reduction side (i.e., the reduction conjugate point) is positioned on the right side. In each of the drawing, a straight line drawn closest to the reduction side represents a position of the original image S, and the optical element P is positioned on the magnification side of the original image S. The optical element P represents different optical elements, such as a prism for color separation and color synthesis, an optical filter, a flat-parallel glass plate, a crystal low-pass filter, and an infrared cut filter.

FIGS. 3A-3C, 8A-8C, 13A-13C, 18A-180, and 23A-23C are longitudinal aberration diagrams of the zoom lens systems according to examples 1 to 5 for an object distance of 1080 mm. FIGS. 4A-4C, 9A-9C, 14A-14C, 19A-19C, and 24A-24C are longitudinal aberration diagrams of the zoom lens systems according to examples 1 to 5 for an object distance of 780 mm. FIGS. 5A-5C, 10A-10C, 15A-15C, 20A-20C, and 25A-25C are longitudinal aberration diagrams of the zoom lens systems according to examples 1 to 5 for an object distance of 2900 mm. In each drawing, FIGS. 3A to 5A, 8A to 10A, 13A to 15A, 18A to 20A, 23A to 25A show longitudinal aberration diagrams at the wide-angle end of the zoom lens system, FIGS. 3B to 5B, 8B to 10B, 13B to 15B, 18B to 20B, 23B to 25B show longitudinal aberration diagrams at the intermediate position, and FIGS. 3C to 5C, 8C to 100, 13C to 15C, 18C to 20C, 23C to 25C show longitudinal aberration diagrams at the telephoto end.

Each of the longitudinal aberration diagrams shows spherical aberration (SA (mm)), astigmatism (AST (mm)), and distortion (DIS (%)) in order from the left side. In the spherical aberration diagram, the vertical axis represents a pupil height, the solid line represents the characteristic of the d-line, the short dashed line represents the characteristic of the F-line, and the long dashed line represents the characteristic of the C-line. In the astigmatism diagram, the vertical axis represents an image height, and the solid line represents the characteristic of the sagittal plane (denoted by s in the drawing), and the dashed line represents characteristic of the meridional plane (denoted by m in the drawing). In the distortion diagram, the vertical axis represents the image height. The distortion aberration represents a distortion with respect to equidistant projection.

Example 1

As shown in FIGS. 1 and 2A-2C, the zoom lens system according to example 1 includes the magnification optical system Op and the relay optical system O1. The magnification optical system Op is constituted of the first lens element L1 to the 12th lens element L12 in order from the magnification side to the reduction side. The first lens element L1 has a negative meniscus shape with the convex surface facing the magnification side. The second lens element L2 has a positive meniscus shape with the convex surface facing the magnification side. The third lens element L3 has a negative meniscus shape with the convex surface facing the magnification side. The fourth lens element L4 has a negative meniscus shape with the convex surface facing the magnification side. The fifth lens element L5 has a biconvex shape. The sixth lens element L6 has a positive meniscus shape with the convex surface facing the reduction side. The seventh lens element L7 has a biconvex shape. The eighth lens element L8 has a biconcave shape. The ninth lens element L9 has a positive meniscus shape with the convex surface facing the reduction side. The 10th lens element L10 has a biconvex shape. The 11th lens element L11 has a biconvex shape. The 12th lens element L12 has a positive meniscus shape with the convex surface facing the magnification side.

The relay optical system O1 is constituted of the 13th lens element L13 to the 25th lens element L25 in order from the magnification side to the reduction side. The 13th lens element L13 has a biconcave shape. The 14th lens element L14 has a biconcave shape. The 15th lens element L15 has a positive meniscus shape with the convex surface facing the reduction side. The 16th lens element L16 has a biconvex shape. The 17th lens element L17 has a biconcave shape. The 18th lens element L18 has a biconvex shape. The 19th lens element L19 has a positive meniscus shape with the convex surface facing the magnification side. The 20th lens element L20 has a negative meniscus shape with the convex surface facing the magnification side. The 21st lens element L21 has a negative meniscus shape with the convex surface facing the reduction side. The 22nd lens element L22 has a biconvex shape. The 23rd lens element L23 has a biconvex shape. The 24th lens element L24 has a negative meniscus shape with the convex surface facing the magnification side. The 25th lens element L25 has a biconvex shape.

The intermediate imaging position MI is positioned between the 12th lens element L12 and the 13th lens element L13. An aperture A is arranged between the 19th lens element L19 and the 20th lens element L20. The optical element P having zero optical power is arranged on the reduction side of the relay optical system O1.

Regarding the focus function, the first positive lens group GP1 is constituted of the first lens element L1 to the ninth lens element L9. The second positive lens group GP2 is constituted of the 10th lens element L10 to the 12th lens element L12. The negative lens group GN is constituted of the 13th lens element L13 and the 14th lens element L14.

Example 2

As shown in FIGS. 6 and 7A-7C, the zoom lens system according to example 2 includes the magnification optical system Op and the relay optical system O1. The magnification optical system Op is constituted of the first lens element L1 to the 12th lens element L12 in order from the magnification side to the reduction side. Shapes of the first lens element L1 to the ninth lens element L9 and the 12th lens element L12 are similar to those of example 1, and redundant description will be omitted. The 10th lens element L10 has a positive meniscus shape with the convex surface facing the reduction side. The 11th lens element L11 has a positive meniscus shape with the convex surface facing the magnification side.

The relay optical system O1 is constituted of the 13th lens element L13 to the 25th lens element L25 in order from the magnification side to the reduction side. These lens shapes are similar to those of example 1, and redundant description will be omitted. The intermediate imaging position MI and the arrangement of the aperture A and the optical element P are also similar to those of example 1.

Regarding the focus function, the first positive lens group GP1 is constituted of the first lens element L1 to the ninth lens element L9. The second positive lens group GP2 is constituted of the 10th lens element L10 to the 12th lens element L12. The negative lens group GN is constituted of the 13th lens element L13 and the 14th lens element L14.

Example 3

As shown in FIGS. 11 and 12A-12C, the zoom lens system according to example 3 includes the magnification optical system Op and the relay optical system O1. The magnification optical system Op is constituted of the first lens element L1 to the 12th lens element L12 in order from the magnification side to the reduction side. The relay optical system O1 is constituted of the 13th lens element L13 to the 25th lens element L25 in order from the magnification side to the reduction side. These lens shapes are similar to those of example 1, and redundant description will be omitted. The intermediate imaging position MI and the arrangement of the aperture A and the optical element P are also similar to those of example 1.

Regarding the focus function, the first positive lens group GP1 is constituted of the first lens element L1 to the ninth lens element L9. The second positive lens group GP2 is constituted of the 10th lens element L10 to the 12th lens element L12. The negative lens group GN is constituted of the 13th lens element L13 and the 14th lens element L14.

Example 4

As shown in FIGS. 16 and 17A-17C, the zoom lens system according to example 4 includes the magnification optical system Op and the relay optical system O1. The magnification optical system Op is constituted of the first lens element L1 to the 12th lens element L12 in order from the magnification side to the reduction side. The relay optical system O1 is constituted of the 13th lens element L13 to the 25th lens element L25 in order from the magnification side to the reduction side. These lens shapes are similar to those of example 1, and redundant description will be omitted. The intermediate imaging position MI and the arrangement of the aperture A and the optical element P are also similar to those of example 1.

Regarding the focus function, the first positive lens group GP1 is constituted of the second lens element L2 to the ninth lens element L9. The second positive lens group GP2 is constituted of the 10th lens element L10 to the 12th lens element L12. The negative lens group GN is constituted of the 13th lens element L13 and the 14th lens element L14. The first lens element L1 is stationary during focusing.

Example 5

As shown in FIGS. 21 and 22A-22C, the zoom lens system according to example 5 includes the magnification optical system Op and the relay optical system O1. The magnification optical system Op is constituted of the first lens element L1 to the 12th lens element L12 in order from the magnification side to the reduction side. These lens shapes are similar to those of example 1, and redundant description will be omitted.

The relay optical system O1 is constituted of the 13th lens element L13 to the 25th lens element L25 in order from the magnification side to the reduction side. The 13th lens element L13 has a negative meniscus shape with the convex surface facing the magnification side. Shapes of the 14th lens element L14 to the 25th lens element L25 are similar to those of example 1, and redundant description will be omitted. The intermediate imaging position MI and the arrangement of the aperture A and the optical element P are also similar to those of example 1.

Regarding the focus function, the first positive lens group GP1 is constituted of the first lens element L1 to the ninth lens element L9. The second positive lens group GP2 is constituted of the 10th lens element L10 to the 12th lens element L12. The negative lens group GN is constituted of the 14th lens element L14. The 13th lens element L13 is stationary during focusing.

Next, conditions which the zoom lens system according to each of examples 1 to 5 can satisfy are described below. Although a plurality of the conditions are defined for the zoom lens system according to each of the examples, all of these plurality of conditions may be satisfied, or the individual conditions may be satisfied to obtain the corresponding effects.

The zoom lens system according to each of examples 1 to 5 is an optical system internally having an intermediate imaging position MI that is conjugate with both of a magnification conjugate point on a magnification side and a reduction conjugate point on a reduction side. The optical system includes: a first positive lens group GP1 including a plurality of lens elements and positioned on the magnification side with respect to the intermediate imaging position; a second positive lens group GP2 including a plurality of lens elements and positioned between the first positive lens group GP1 and the intermediate imaging position M1; and a negative lens group GN including a plurality of lens elements and positioned on the reduction side with respect to the intermediate imaging position MI. During focusing, the first positive lens group GP1 and the negative lens group GN move in an optical axis direction, and the second positive lens group GP2 is stationary.

According to such configuration, the first positive lens group indicates a smaller change in back focus and a larger change in field curvature due to movement. The negative lens group indicates a smaller change in field curvature and a larger change in back focus due to movement, and therefore focus adjustment becomes easier to perform. The negative lens group can have a small lens diameter, and therefore the focus configuration can be reduced in size and weight.

Further, the zoom lens system according to each of examples 1 to 5 may satisfy the following condition (1):

$$0.10 < \beta p2 < 0.35 \tag{1}$$

where $\beta p2$ is a lateral magnification of the second positive lens group GP2.

By satisfying the condition (1), back focus fluctuation can be reduced when the first positive lens group moves, correction for field curvature generated by the first positive lens group becomes easier to perform, and focus adjustment becomes easier to perform. If exceeding the upper limit of the condition (1), back focus fluctuation of the first positive lens group increases. On the other hand, if falling below the lower limit of the condition (1), larger astigmatism is generated when focus adjustment is performed.

In addition to the condition (1), more advantageous effects can be obtained by further satisfying the following condition (1A):

$$0.21 < \beta p2 < 0.25 \tag{1A}$$

The zoom lens system according to each of examples 1 to 5 may satisfy the following condition (2):

$$0.2 < \beta n < 1.0 \tag{2}$$

where $\beta n$ is a lateral magnification of the negative lens group GN.

By satisfying the condition (2), back focus fluctuation is increased when the negative lens group moves, and focus adjustment becomes easier to perform. If exceeding the upper limit of the condition (2), aberration due to eccentricity made during manufacturing is increased. On the other hand, if falling below the lower limit of the condition (2), sensitivity of back focus during focus adjustment is decreased, and field curvature becomes relatively likely to occur.

In addition to the condition (2), more advantageous effects can be obtained by further satisfying the following condition (2A):

$$0.4 < \beta n < 0.7 \tag{2A}$$

The zoom lens system according to each of examples 1 to 5 may satisfy the following condition (3):

$$-0.2 < \beta p1 < 0.0 \tag{3}$$

where $\beta p1$ is a lateral magnification of the first positive lens group GP1.

By satisfying the condition (3), back focus fluctuation can be reduced when the first positive lens group moves, correction for field curvature generated by the first positive lens group becomes easier to perform, and focus adjustment becomes easier to perform. If exceeding the upper limit of the condition (3), back focus fluctuation of the first positive lens group increases. On the other hand, even if falling below the lower limit of the condition (3), back focus fluctuation of the first positive lens group also increases.

The zoom lens system according to each of examples 1 to 5 may satisfy the following condition (4):

$$2.0 < fp1/fo < 10.0 \tag{4}$$

where fp1 is a focal length of the first positive lens group GP1, and fo is a focal length of the entire magnification optical system Op positioned on a magnification side with respect to the intermediate imaging position MI.

The condition (4) is a conditional expression for defining the relationship between the focal length of the first positive lens group and the focal length of the entire magnification optical system positioned on the magnification side with respect to the intermediate imaging position. By satisfying the condition (4), back focus fluctuation can be reduced when the first positive lens group moves, correction for field curvature generated by the first positive lens group becomes easier to perform, and focus adjustment becomes easier to perform. If exceeding the upper limit of the condition (4), back focus fluctuation of the first positive lens group increases. On the other hand, if falling below the lower limit of the condition (4), larger astigmatism is generated when focus adjustment is performed.

In addition to the condition (4), more advantageous effects can be obtained by further satisfying the following condition (4A):

$$3.5 < fp1/fo < 5.0 \tag{4A}$$

The zoom lens system according to each of examples 1 to 5 may satisfy the following condition (5):

$$-5.0 < fn/fo < -1.0 \tag{5}$$

where fn is a focal length of the negative lens group GN, and fo is a focal length of the entire magnification optical system Op positioned on the magnification side with respect to the intermediate imaging position MI.

The condition (5) is a conditional expression for defining the relationship between the focal length of the negative lens group and the focal length of the entire magnification optical system positioned on the magnification side with respect to the intermediate imaging position. By satisfying the condition (5), back focus fluctuation is increased when the negative lens group moves, and focus adjustment becomes easier to perform. If exceeding the upper limit of the condition (5), aberration due to eccentricity made during manufacturing is increased. On the other hand, if falling below the lower limit of the condition (5), sensitivity of back focus during focus adjustment is decreased, and field curvature becomes relatively likely to occur.

In addition to the condition (5), more advantageous effects can be obtained by further satisfying the following condition (5A):

$$-2.0 < fn/fo < -1.4 \tag{5A}$$

In the zoom lens systems according to examples 1 to 5, a magnification side-closest lens element positioned closest to the magnification side of the second positive lens group GP2 may have a positive power and satisfy the following condition (6):

$$-1.40 < (R2+R1)/(R2-R1) < -0.70 \tag{6}$$

where R1 is a radius of curvature of the surface on the magnification side of the magnification side-closest lens element, and R2 is a radius of curvature of the surface on the reduction side of the magnification side-closest lens element.

The condition (6) is a conditional expression for defining the relationship between the radii of curvature of the surface on the magnification side and the radius of curvature of the surface on the reduction side of the magnification side-closest lens element. By satisfying the condition (6), back focus fluctuation can be reduced when the first positive lens group moves. If exceeding the upper limit of the condition (6), back focus fluctuation is increased when the first positive lens group moves, and inversely, if falling below the lower limit of the condition (6), larger astigmatism is generated when focus adjustment is performed.

By way of example, in examples 1 to 5, the magnification side-closest lens element positioned closest to the magnification side of the second positive lens group GP2 may be the 10th lens element L10 having a biconvex shape or a positive meniscus shape with the convex surface facing the reduction side.

In addition to the condition (6), more advantageous effects can be obtained by further satisfying the following condition (6A):

$$-1.10 < (R2+R1)/R2-R1) < -0.84 \qquad (6A)$$

The zoom lens system according to each of examples 1 to 5 may further include an adjacent lens element adjacent to the reduction side of the negative lens group GN and having a positive power, and satisfying the following condition (7):

$$npd > 1.85 \qquad (7)$$

where npd is a refractive index of the adjacent lens element.

By satisfying the condition (7), fluctuation in field can be reduced curvature when the negative lens group moves. By way of example, in examples 1 to 5, the adjacent lens element may be the 15th lens element L15 having a positive meniscus shape with the convex surface facing the reduction side.

The zoom lens system according to each of examples 1 to 5 may further include an adjacent lens element adjacent to the reduction side of the negative lens group GN and having a positive power, and satisfying the following condition (8):

$$25 < vpd < 30 \qquad (8)$$

where vpd is an Abbe number of the adjacent lens element.

By satisfying the condition (8), fluctuation in chromatic aberration can be reduced when the negative lens group moves. If exceeding the upper limit of the condition (8), chromatic aberration fluctuation during focusing, in particular at the wide-angle end, is increased. On the other hand, if falling below the lower limit of the condition (8), chromatic aberration fluctuation during focusing, in particular at the telephoto end, is increased.

In the zoom lens systems according to examples 1 to 4, the negative lens group GN may include the lens element positioned closest to the magnification side among the plurality of lens elements positioned on the reduction side with respect to the intermediate imaging position MI.

According to such configuration, fluctuation in field can be reduced curvature when the negative lens group moves. By way of example, in example 1 to 4, the negative lens group GN may include the 13th lens element L13 positioned closest to the magnification side among the plurality of lens elements L13 to L25 positioned on the reduction side with respect to the intermediate imaging position MI.

In the zoom lens systems according to examples 1 to 4, the negative lens group GN may be constituted of two lens elements each having a biconcave shape.

According to such configuration, back focus fluctuation can be increased when the negative lens group moves, and occurrence of the field curvature can be reduced. This enables division of roles of focus adjustment, and therefore focus adjustment becomes easier to perform. By way of example, in example 1 to 4, the negative lens group GN may be constituted of the 13th lens element L13 having a biconcave shape and the 14th lens element L14 having a biconcave shape.

In the zoom lens systems according to examples 1 to 3 and 5, the first positive lens group GP1 may include the lens element positioned closest to the magnification side among the plurality of lens elements positioned on the magnification side with respect to the intermediate imaging position MI.

According to such configuration, the configuration of a focus mechanism member can be simplified.

By way of example, in examples 1 to 3 and 5, the first positive lens group GP1 may include the first lens element L1 positioned closest to the magnification side among the plurality of lens elements L1 to L12 positioned on the magnification side with respect to the intermediate imaging position MI.

As described above, some examples have been described to exemplify the technology disclosed in the present application. The technology of the present disclosure, however, is not limited only to these examples, but also can be applied to other embodiments appropriately devised through modification, substitution, addition, omission and so on.

Hereinafter, numerical examples of the zoom lens system according to examples 1 to 5 are described. In each of the numerical examples, in the table, the unit of length is all "mm", and the unit of angle of view is all "°" (degree). Further, in each of the numerical examples, r is a radius of curvature, d is a surface interval, nd is a refractive index for d line, and vd is an Abbe number for d line. Further, in each of the numerical examples, a surface marked with "*" is aspherical, and the aspherical shape is defined by the following formula.

$$Z = \frac{h^2/r}{1 + \sqrt{1 - (1 + \kappa)(h/r)^2}} + \sum A_n h^n \qquad \text{[Mathematical Formula 1]}$$

where Z is a distance from a point located on an aspherical surface at a height "h" from the optical axis, to the tangent plane of the aspherical vertex, h is a height from the optical axis, r is a radius of curvature of the vertex, κ is a cone constant, and An is a nth-order aspherical coefficient.

Numerical Example 1

Regarding the zoom lens system of numerical example 1 (corresponding to example 1), Table 1 shows surface data, Table 2 shows various data, Table 3 shows focus data and Table 4 shows single lens data, Table 5 shows zoom lens group data, and Table 6 shows zoom lens group magnification ratios (unit: mm).

TABLE 1

| | Surface data | | | |
|---|---|---|---|---|
| SURFACE NUMBER | r | d | nd | vd |
| Object plane | ∞ (infinity) | | | |
| 1 | 82.55780 | 4.50000 | 1.84666 | 23.8 |
| 2 | 44.55160 | 11.06650 | | |
| 3 | 69.33030 | 8.52300 | 1.85883 | 30.0 |
| 4 | 133.67220 | 0.20010 | | |
| 5 | 50.85360 | 2.50000 | 1.87071 | 40.7 |
| 6 | 24.24730 | 6.50560 | | |
| 7* | 24.00860 | 2.60000 | 1.58560 | 58.9 |
| 8* | 12.32090 | 12.86710 | | |
| 9 | 80.89650 | 3.52100 | 1.51680 | 64.2 |
| 10 | −222.82880 | 6.22010 | | |
| 11 | −290.61360 | 2.96520 | 1.61997 | 63.9 |
| 12 | −44.67100 | 0.87470 | | |
| 13 | 137.60190 | 7.95190 | 1.43700 | 95.1 |
| 14 | −22.20850 | 1.94110 | | |
| 15 | −26.19400 | 1.50000 | 1.86966 | 20.0 |
| 16 | 413.84650 | 3.99060 | | |
| 17* | −44.70600 | 7.03060 | 1.80755 | 40.9 |
| 18* | −21.48260 | 2.27070 | | |
| 19 | 601.51980 | 13.55710 | 1.49700 | 81.6 |
| 20 | −42.87920 | 8.69250 | | |
| 21 | 100.40190 | 8.17950 | 1.92286 | 20.9 |

13

TABLE 1-continued

Surface data

| SURFACE NUMBER | r | d | nd | vd |
|---|---|---|---|---|
| 22 | −2603.87270 | 0.20000 | | |
| 23 | 38.37610 | 14.18340 | 1.92286 | 20.9 |
| 24 | 84.65110 | 14.82680 | | |
| 25 | −242.34250 | 5.00000 | 1.80809 | 22.8 |
| 26 | 38.72750 | 9.94890 | | |
| 27 | −42.25540 | 10.00000 | 1.77047 | 29.7 |
| 28 | 144.66080 | 20.27510 | | |
| 29 | −132.28900 | 12.06400 | 1.85451 | 25.2 |
| 30 | −44.68970 | variable | | |
| 31 | 189.92110 | 6.10080 | 1.77250 | 49.6 |
| 32 | −189.92110 | 45.81600 | | |
| 33 | −58.71800 | 1.50000 | 1.59270 | 35.4 |
| 34 | 58.71800 | 2.86370 | | |
| 35 | 67.66000 | 8.00090 | 1.49700 | 81.6 |
| 36 | −48.05880 | variable | | |
| 37 | 30.13800 | 6.14480 | 1.67300 | 38.3 |
| 38 | 75.30020 | 1.92430 | | |
| 39 (Aperture) | ∞ | 0.20000 | | |
| 40 | 39.00960 | 1.50000 | 1.51680 | 64.2 |
| 41 | 19.53140 | 28.21900 | | |
| 42 | −25.33820 | 1.50000 | 1.73800 | 32.3 |
| 43 | −275.52850 | 1.10580 | | |
| 44 | 277.84170 | 8.01780 | 1.43700 | 95.1 |
| 45 | −29.61870 | variable | | |
| 46 | 68.93650 | 7.82660 | 1.49700 | 81.6 |
| 47 | −68.93650 | 1.30510 | | |
| 48 | 63.66180 | 1.80000 | 1.73800 | 32.3 |
| 49 | 31.89260 | 3.18230 | | |
| 50 | 37.30830 | 10.18660 | 1.43700 | 95.1 |
| 51 | −78.81430 | variable | | |
| 52 (P) | ∞ | 31.90000 | 1.51680 | 64.2 |
| 53 | ∞ | BF | | |
| Image plane | ∞ | | | |

Aspherical Data

7th Surface

K=0.00000E+00, A4=7.56283E−07, A6=−7.89853E−08, A8=1.03168E−10, A10=−2.03953E−13, A12=1.61052E−16

8th Surface

K=−8.25316E−01, A4=−7.92622E−06, A6=−1.12300E−07, A8=−1.78382E−10, A10=5.29776E−13, A12=7.12021E−16

17th Surface

K=0.00000E+00, A4=4.30120E−07, A6=1.36064E−08, A8=−2.16679E−10, A10=8.30030E−13, A12=−8.45350E−16

18th Surface

K=0.00000E+00, A4=1.04919E−05, A6=1.31013E−08, A8=7.83133E−11, A10=−3.79608E−13, A12=1.00893E−15

TABLE 2

Various data

| Zoom ratio | 1.07260 | | |
|---|---|---|---|
| | WIDE-ANGLE | INTER-MEDIATE | TELE-PHOTO |
| Focal length | −5.4391 | −5.6167 | −5.8340 |
| F number | −1.99438 | −1.99438 | −1.99519 |
| Angle of view | −67.2435 | −66.6302 | −65.8817 |
| Image height | 13.2500 | 13.2500 | 13.2500 |
| Total length of lens | 495.0099 | 495.0181 | 495.0277 |
| BF | 1.71841 | 1.72656 | 1.73617 |
| d30 | 98.8440 | 93.2447 | 86.3781 |
| d36 | 2.0005 | 7.5998 | 14.4664 |
| d45 | 3.0311 | 2.6032 | 2.0000 |

14

TABLE 2-continued

Various data

| | WIDE-ANGLE | INTER-MEDIATE | TELE-PHOTO |
|---|---|---|---|
| d51 | 16.3667 | 16.7946 | 17.3978 |
| Position of entrance pupil | 33.6261 | 33.6530 | 33.6907 |
| Position of exit pupil | −1230.1264 | −1034.2082 | −844.6386 |
| Position of front principal point | 28.1630 | 28.0059 | 27.8166 |
| Position of rear principal point | 500.4225 | 500.6064 | 500.8311 |

TABLE 3

Focus data

| | | WIDE-ANGLE | INTER-MEDIATE | TELE-PHOTO |
|---|---|---|---|---|
| Object distance | | 1080 | | |
| | d18 | 2.271 | 2.271 | 2.271 |
| | d24 | 14.827 | 14.827 | 14.827 |
| | d28 | 20.275 | 20.275 | 20.275 |
| Object distance | | 780 | | |
| | d18 | 2.458 | 2.447 | 2.437 |
| | d24 | 14.793 | 14.798 | 14.810 |
| | d28 | 20.309 | 20.303 | 20.292 |
| Object distance | | 2900 | | |
| | d18 | 2.024 | 2.018 | 2.013 |
| | d24 | 14.834 | 14.837 | 14.841 |
| | d28 | 20.268 | 20.264 | 20.261 |

TABLE 4

Single lens data

| Lens element | First surface | Focal length |
|---|---|---|
| 1 | 1 | −120.8636 |
| 2 | 3 | 158.0385 |
| 3 | 5 | −55.6610 |
| 4 | 7 | −47.0881 |
| 5 | 9 | 115.2969 |
| 6 | 11 | 84.7502 |
| 7 | 13 | 44.4302 |
| 8 | 15 | −28.2820 |
| 9 | 17 | 45.1092 |
| 10 | 19 | 81.1016 |
| 11 | 21 | 104.9074 |
| 12 | 23 | 66.3145 |
| 13 | 25 | −40.9955 |
| 14 | 27 | −41.4796 |
| 15 | 29 | 74.2670 |
| 16 | 31 | 123.7928 |
| 17 | 33 | −49.2997 |
| 18 | 35 | 57.8669 |
| 19 | 37 | 70.7909 |
| 20 | 40 | −77.7289 |
| 21 | 42 | −37.9073 |
| 22 | 44 | 61.7376 |
| 23 | 46 | 70.6848 |
| 24 | 48 | −88.7325 |
| 25 | 50 | 59.5325 |

TABLE 5

Zoom lens group data

| Gr. | 1st. surf. | Focal length | Length of lens group | Position of front principal point | Position of rear principal point |
|---|---|---|---|---|---|
| 1 | 1 | 16.25114 | 203.95550 | 50.63261 | 62.90935 |
| 2 | 31 | 148.60132 | 64.28140 | 13.41062 | 8.57894 |
| 3 | 37 | −354.97558 | 48.61170 | 99.51621 | 83.49706 |
| 4 | 46 | 52.88173 | 24.30060 | 8.67722 | 13.88961 |

TABLE 6

Zoom lens group magnification ratio

| Gr. | 1st. surf. | WIDE-ANGLE | INTER-MEDIATE | TELE-PHOTO |
|---|---|---|---|---|
| 1 | 1 | −0.01458 | −0.01458 | −0.01458 |
| 2 | 31 | −1.68461 | −1.79879 | −1.96185 |
| 3 | 37 | 3.13420 | 3.48388 | 4.19963 |
| 4 | 46 | 0.06343 | 0.05519 | 0.04360 |

Numerical Example 2

Regarding the zoom lens system of numerical example 2 (corresponding to example 2), Table 7 shows surface data, Table 8 shows various data, Table 9 shows focus data and Table 10 shows single lens data, Table 11 shows zoom lens group data, and Table 12 shows zoom lens group magnification ratios (unit: mm).

TABLE 7

Surface data

| SURFACE NUMBER | r | d | nd | vd |
|---|---|---|---|---|
| Object plane | ∞ (infinity) | | | |
| 1 | 78.65380 | 4.50000 | 1.84666 | 23.8 |
| 2 | 44.66850 | 10.81770 | | |
| 3 | 67.01600 | 8.57080 | 1.85883 | 30.0 |
| 4 | 120.35830 | 0.20000 | | |
| 5 | 52.79860 | 2.50000 | 1.87071 | 40.7 |
| 6 | 24.31400 | 7.37020 | | |
| 7* | 24.00100 | 2.60000 | 1.58560 | 58.9 |
| 8* | 12.32940 | 12.02600 | | |
| 9 | 76.12200 | 3.91680 | 1.51680 | 64.2 |
| 10 | −227.26320 | 6.11480 | | |
| 11 | −134.82570 | 2.72200 | 1.61997 | 63.9 |
| 12 | −42.18980 | 1.32270 | | |
| 13 | 109.14310 | 8.17640 | 1.43700 | 95.1 |
| 14 | −21.67850 | 1.83900 | | |
| 15 | −25.22670 | 1.50000 | 1.86966 | 20.0 |
| 16 | 853.46760 | 3.91660 | | |
| 17* | −43.38540 | 6.96170 | 1.80755 | 40.9 |
| 18* | −21.45340 | 2.21800 | | |
| 19 | −5983.66470 | 13.71330 | 1.49700 | 81.6 |
| 20 | −39.94890 | 7.63600 | | |
| 21 | 86.82100 | 8.68950 | 1.92286 | 20.9 |
| 22 | 1596.62870 | 0.78700 | | |
| 23 | 38.22640 | 13.74180 | 1.92286 | 20.9 |
| 24 | 80.91150 | 14.83300 | | |
| 25 | −256.54640 | 5.00000 | 1.80809 | 22.8 |
| 26 | 38.45700 | 9.98490 | | |
| 27 | −41.58820 | 10.00000 | 1.77047 | 29.7 |
| 28 | 150.79090 | 20.37000 | | |
| 29 | −134.90790 | 12.08240 | 1.85451 | 25.2 |
| 30 | −44.84640 | variable | | |
| 31 | 190.03610 | 6.08060 | 1.77250 | 49.6 |
| 32 | −190.03610 | 45.44500 | | |

TABLE 7-continued

Surface data

| SURFACE NUMBER | r | d | nd | vd |
|---|---|---|---|---|
| 33 | −58.64730 | 1.50000 | 1.59270 | 35.4 |
| 34 | 58.64730 | 2.90070 | | |
| 35 | 67.70410 | 7.98640 | 1.49700 | 81.6 |
| 36 | −48.06860 | variable | | |
| 37 | 30.14240 | 6.12920 | 1.67300 | 38.3 |
| 38 | 75.76270 | 1.90640 | | |
| 39 (Aperture) | ∞ | 0.20000 | | |
| 40 | 38.91790 | 1.50000 | 1.51680 | 64.2 |
| 41 | 19.53610 | 28.19300 | | |
| 42 | −25.09060 | 1.50000 | 1.73800 | 32.3 |
| 43 | −278.39410 | 1.09150 | | |
| 44 | 302.00510 | 7.98570 | 1.43700 | 95.1 |
| 45 | −29.14940 | variable | | |
| 46 | 68.50740 | 7.87850 | 1.49700 | 81.6 |
| 47 | −68.50740 | 1.31350 | | |
| 48 | 63.76830 | 1.80000 | 1.73800 | 32.3 |
| 49 | 31.87940 | 3.16190 | | |
| 50 | 37.19870 | 10.08800 | 1.43700 | 95.1 |
| 51 | −79.33860 | variable | | |
| 52 (P) | ∞ | 31.90000 | 1.51680 | 64.2 |
| 53 | ∞ | BF | | |
| Image plane | ∞ | | | |

Aspherical Data

7th Surface
 $K=0.00000E+00$, $A4=1.11435E-06$, $A6=-7.88133E-08$, $A8=1.01302E-10$, $A10=-2.08070E-13$, $A12=1.70553E-16$ 8th Surface
 $K=-8.23517E-01$, $A4=-6.99068E-06$, $A6=-1.16346E-07$, $A8=-1.77485E-10$, $A10=5.45776E-13$, $A12=6.78228E-16$ 17th Surface
 $K=0.00000E+00$, $A4=4.33622E-07$, $A6=1.34730E-08$, $A8=-2.16335E-10$, $A10=8.32418E-13$, $A12=-8.36858E-16$ 18th Surface
 $K=0.00000E+00$, $A4=1.01805E-05$, $A6=1.36460E-08$, $A8=7.78007E-11$, $A10=-3.76506E-13$, $A12=1.01333E-15$

TABLE 8

Various data

| Zoom ratio | 1.07253 | | |
|---|---|---|---|
| | WIDE-ANGLE | INTER-MEDIATE | TELE-PHOTO |
| Focal length | −5.4564 | −5.6344 | −5.8522 |
| F number | −1.99434 | −1.99442 | −1.99530 |
| Angle of view | −67.2323 | −66.6181 | −65.8688 |
| Image height | 13.2500 | 13.2500 | 13.2500 |
| Total length of lens | 495.0171 | 495.0251 | 495.0361 |
| BF | 1.71726 | 1.72599 | 1.73650 |
| d30 | 99.2310 | 93.6310 | 86.7700 |
| d36 | 2.0000 | 7.5993 | 14.4608 |
| d45 | 3.0203 | 2.5971 | 2.0015 |
| d51 | 16.3775 | 16.8007 | 17.3963 |
| Position of entrance pupil | 34.3194 | 34.3464 | 34.3841 |
| Position of exit pupil | −1220.8608 | −1028.5274 | −841.9309 |
| Position of front principal point | 28.8386 | 28.6811 | 28.4913 |
| Position of rear principal point | 500.4468 | 500.6310 | 500.8576 |

TABLE 10

| Focus data | | | | |
|---|---|---|---|---|
| | | WIDE-ANGLE | INTER-MEDIATE | TELE-PHOTO |
| Object distance | | 1080 | | |
| | d18 | 2.218 | 2.218 | 2.218 |
| | d24 | 14.833 | 14.833 | 14.833 |
| | d28 | 20.370 | 20.370 | 20.370 |
| Object distance | | 780 | | |
| | d18 | 2.402 | 2.383 | 2.355 |
| | d24 | 14.804 | 14.806 | 14.809 |
| | d28 | 20.399 | 20.397 | 20.393 |
| Object distance | | 2900 | | |
| | d18 | 2.000 | 1.975 | 1.957 |
| | d24 | 14.850 | 14.850 | 14.851 |
| | d28 | 20.353 | 20.353 | 20.351 |

TABLE 10

| Single lens data | | |
|---|---|---|
| Lens element | First surface | Focal length |
| 1 | 1 | −129.9925 |
| 2 | 3 | 163.8980 |
| 3 | 5 | −53.9649 |
| 4 | 7 | −47.1765 |
| 5 | 9 | 110.8252 |
| 6 | 11 | 97.9437 |
| 7 | 13 | 42.1888 |
| 8 | 15 | −28.1523 |
| 9 | 17 | 46.0253 |
| 10 | 19 | 80.8584 |
| 11 | 21 | 99.2141 |
| 12 | 23 | 68.0086 |
| 13 | 25 | −41.0750 |
| 14 | 27 | −41.3730 |
| 15 | 29 | 74.0392 |
| 16 | 31 | 123.8643 |
| 17 | 33 | −49.2401 |
| 18 | 35 | 57.8863 |
| 19 | 37 | 70.5668 |
| 20 | 40 | −77.9610 |
| 21 | 42 | −37.4599 |
| 22 | 44 | 61.2812 |
| 23 | 46 | 70.2622 |
| 24 | 48 | −88.5024 |
| 25 | 50 | 59.5183 |

TABLE 11

| Zoom lens group data | | | | | |
|---|---|---|---|---|---|
| Gr. | 1st. surf. | Focal length | Length of lens group | Position of front principal point | Position of rear principal point |
| 1 | 1 | 16.39300 | 204.11060 | 51.48340 | 62.73418 |
| 2 | 31 | 149.07117 | 63.91270 | 13.43489 | 8.63762 |
| 3 | 37 | −351.67597 | 48.50580 | 99.51936 | 83.37005 |
| 4 | 46 | 52.72608 | 24.24190 | 8.62734 | 13.83298 |

TABLE 12

| Zoom lens group magnification ratio | | | | |
|---|---|---|---|---|
| Gr. | 1st. surf. | WIDE-ANGLE | INTER-MEDIATE | TELE-PHOTO |
| 1 | 1 | −0.01470 | −0.01470 | −0.01470 |
| 2 | 31 | −1.68753 | −1.80174 | −1.96466 |
| 3 | 37 | 3.26115 | 3.64769 | 4.45243 |
| 4 | 46 | 0.06053 | 0.05233 | 0.04084 |

Numerical Example 3

Regarding the zoom lens system of numerical example 3 (corresponding to example 3), Table 13 shows surface data, Table 14 shows various data, Table 15 shows focus data and Table 16 shows single lens data, Table 17 shows zoom lens group data, and Table 18 shows zoom lens group magnification ratios (unit: mm).

TABLE 13

| Surface data | | | | |
|---|---|---|---|---|
| SURFACE NUMBER | r | d | nd | vd |
| Object plane | ∞ (infinity) | | | |
| 1 | 80.59500 | 4.50000 | 1.84666 | 23.8 |
| 2 | 44.27300 | 11.44660 | | |
| 3 | 72.04840 | 7.97400 | 1.85883 | 30.0 |
| 4 | 136.72170 | 0.20000 | | |
| 5 | 49.64910 | 2.50000 | 1.87071 | 40.7 |
| 6 | 24.00610 | 5.83290 | | |
| 7* | 24.00050 | 2.60000 | 1.58560 | 58.9 |
| 8* | 12.34800 | 12.67700 | | |
| 9 | 93.13040 | 3.46420 | 1.51680 | 64.2 |
| 10 | −200.00220 | 6.27540 | | |
| 11 | −374.28160 | 3.05930 | 1.61997 | 63.9 |
| 12 | −43.97220 | 1.04070 | | |
| 13 | 136.68270 | 8.02210 | 1.43700 | 95.1 |
| 14 | −22.41370 | 1.78690 | | |
| 15 | −27.19460 | 1.50000 | 1.86966 | 20.0 |
| 16 | 293.67690 | 4.21420 | | |
| 17* | −44.57890 | 7.03180 | 1.80755 | 40.9 |
| 18* | −21.58120 | 2.23400 | | |
| 19 | 526.64910 | 13.31090 | 1.49700 | 81.6 |
| 20 | −44.44340 | 10.07570 | | |
| 21 | 110.84850 | 8.44960 | 1.92286 | 20.9 |
| 22 | −685.03570 | 0.20000 | | |
| 23 | 39.02490 | 13.44480 | 1.92286 | 20.9 |
| 24 | 88.90430 | 14.90100 | | |
| 25 | −538.90160 | 5.00000 | 1.80809 | 22.8 |
| 26 | 38.76420 | 10.77330 | | |
| 27 | −40.62530 | 9.96550 | 1.77047 | 29.7 |
| 28 | 129.93720 | 20.35100 | | |
| 29 | −130.81870 | 12.05750 | 1.85451 | 25.2 |
| 30 | −44.69800 | variable | | |
| 31 | 189.90170 | 6.09480 | 1.77250 | 49.6 |
| 32 | −189.90170 | 45.49800 | | |
| 33 | −58.78080 | 1.50000 | 1.59270 | 35.4 |
| 34 | 58.78080 | 3.08380 | | |
| 35 | 68.88570 | 8.30580 | 1.49700 | 81.6 |
| 36 | −47.69680 | variable | | |
| 37 | 30.01130 | 6.07220 | 1.67300 | 38.3 |
| 38 | 75.03690 | 1.88690 | | |
| 39 (Aperture) | ∞ | 0.20000 | | |
| 40 | 38.55390 | 1.50000 | 1.51680 | 64.2 |
| 41 | 19.44610 | 28.34700 | | |
| 42 | −24.91450 | 1.50000 | 1.73800 | 32.3 |
| 43 | −246.22550 | 1.22950 | | |
| 44 | 327.48140 | 8.21800 | 1.43700 | 95.1 |
| 45 | −29.00790 | variable | | |
| 46 | 68.99840 | 7.90960 | 1.49700 | 81.6 |
| 47 | −68.99840 | 0.78330 | | |
| 48 | 62.93750 | 1.80000 | 1.73800 | 32.3 |
| 49 | 31.80840 | 3.22380 | | |

TABLE 13-continued

Surface data

| SURFACE NUMBER | r | d | nd | vd |
|---|---|---|---|---|
| 50 | 37.35710 | 10.09380 | 1.43700 | 95.1 |
| 51 | −80.60140 | variable | | |
| 52 (P) | ∞ | 31.90000 | 1.51680 | 64.2 |
| 53 | ∞ | BF | | |
| Image plane | ∞ | | | |

Aspherical Data

7th Surface
K=0.00000E+00, A4=1.03066E-06, A6=−8.06153E-08, A8=1.02233E-10, A10=−2.00539E-13, A12=1.58927E-16

8th Surface
K=−8.26364E-01, A4=−7.69220E-06, A6=−1.08964E-07, A8=−1.82713E-10, A10=4.91059E-13, A12=8.04265E-16

17th Surface
K=0.00000E+00, A4=1.68440E-07, A6=1.39674E-08, A8=−2.18164E-10, A10=8.24370E-13, A12=−8.23451E-16

18th Surface
K=0.00000E+00, A4=1.01581E-05, A6=1.23765E-08, A8=7.65915E-11, A10=−3.83513E-13, A12=1.00766E-15

TABLE 14

Various data

Zoom ratio       1.07248

| | WIDE-ANGLE | INTER-MEDIATE | TELE-PHOTO |
|---|---|---|---|
| Focal length | −5.4340 | −5.6115 | −5.8279 |
| F number | −1.99441 | −1.99405 | −1.99434 |
| Angle of view | −67.2530 | −66.6367 | −65.8875 |
| Image height | 13.2500 | 13.2500 | 13.2500 |
| Total length of lens | 495.0174 | 495.0257 | 495.0366 |
| BF | 1.71804 | 1.72661 | 1.73698 |
| d30 | 97.8910 | 92.2780 | 85.4170 |
| d36 | 2.0000 | 7.6127 | 14.4741 |
| d45 | 3.0055 | 2.5880 | 2.0014 |
| d51 | 16.3680 | 16.7855 | 17.3722 |
| Position of entrance pupil | 33.2775 | 33.3046 | 33.3425 |
| Position of exit pupil | −1755.2161 | −1389.6158 | −1074.9275 |
| Position of front principal point | 27.8267 | 27.6705 | 27.4831 |
| Position of rear principal point | 500.4249 | 500.6089 | 500.8340 |

TABLE 15

Focus data

| | | WIDE-ANGLE | INTER-MEDIATE | TELE-PHOTO |
|---|---|---|---|---|
| Object distance | | 1080 | | |
| | d18 | 2.234 | 2.234 | 2.234 |
| | d24 | 14.901 | 14.901 | 14.901 |
| | d28 | 20.351 | 20.351 | 20.351 |
| Object distance | | 780 | | |
| | d18 | 2.470 | 2.425 | 2.380 |
| | d24 | 14.918 | 14.900 | 14.882 |
| | d28 | 20.334 | 20.334 | 20.371 |

TABLE 15-continued

Focus data

| | | WIDE-ANGLE | INTER-MEDIATE | TELE-PHOTO |
|---|---|---|---|---|
| Object distance | | 2900 | | |
| | d18 | 1.980 | 1.990 | 2.000 |
| | d24 | 14.911 | 14.915 | 14.923 |
| | d28 | 20.342 | 20.342 | 20.330 |

TABLE 16

Single lens data

| Lens element | First surface | Focal length |
|---|---|---|
| 1 | 1 | −123.0165 |
| 2 | 3 | 167.7901 |
| 3 | 5 | −55.9192 |
| 4 | 7 | −47.3311 |
| 5 | 9 | 123.4506 |
| 6 | 11 | 80.0850 |
| 7 | 13 | 44.7502 |
| 8 | 15 | −28.5579 |
| 9 | 17 | 45.5766 |
| 10 | 19 | 83.1074 |
| 11 | 21 | 103.9144 |
| 12 | 23 | 66.7379 |
| 13 | 25 | −44.5787 |
| 14 | 27 | −39.1730 |
| 15 | 29 | 74.6424 |
| 16 | 31 | 123.7794 |
| 17 | 33 | −49.3527 |
| 18 | 35 | 58.0797 |
| 19 | 37 | 70.4922 |
| 20 | 40 | −78.0087 |
| 21 | 42 | −37.6684 |
| 22 | 44 | 61.4086 |
| 23 | 46 | 70.7614 |
| 24 | 48 | −89.3357 |
| 25 | 50 | 59.9729 |

TABLE 17

Zoom lens group data

| Gr. | 1st. surf. | Focal length | Length of lens group | Position of front principal point | Position of rear principal point |
|---|---|---|---|---|---|
| 1 | 1 | 16.41406 | 204.88840 | 50.46582 | 63.76402 |
| 2 | 31 | 148.63025 | 64.48240 | 14.92193 | 9.37704 |
| 3 | 37 | −375.73417 | 48.95360 | 100.72553 | 84.58832 |
| 4 | 46 | 52.92501 | 23.81050 | 8.47281 | 13.78094 |

TABLE 18

Zoom lens group magnification ratio

| Gr. | 1st. surf. | WIDE-ANGLE | INTER-MEDIATE | TELE-PHOTO |
|---|---|---|---|---|
| 1 | 1 | −0.01473 | −0.01473 | −0.01473 |
| 2 | 31 | −1.67657 | −1.78990 | −1.95111 |
| 3 | 37 | 2.76794 | 3.01761 | 3.49798 |
| 4 | 46 | 0.07139 | 0.06334 | 0.05206 |

Numerical Example 4

Regarding the zoom lens system of numerical example 4 (corresponding to example 4), Table 19 shows surface data, Table 20 shows various data, Table 21 shows focus data and Table 22 shows single lens data, Table 23 shows zoom lens group data, and Table 24 shows zoom lens group magnification ratios (unit: mm).

TABLE 19

| Surface data | | | | |
|---|---|---|---|---|
| SURFACE NUMBER | r | d | nd | vd |
| Object plane | ∞ (infinity) | | | |
| 1 | 87.81990 | 4.50000 | 1.84666 | 23.8 |
| 2 | 46.78620 | 11.95170 | | |
| 3 | 74.87290 | 8.74330 | 1.85883 | 30.0 |
| 4 | 149.55990 | 2.15040 | | |
| 5 | 48.37110 | 2.50000 | 1.87071 | 40.7 |
| 6 | 23.17200 | 4.53890 | | |
| 7* | 24.00010 | 2.60000 | 1.58560 | 58.9 |
| 8* | 12.38630 | 13.26250 | | |
| 9 | 77.81960 | 3.46180 | 1.51680 | 64.2 |
| 10 | −262.70540 | 5.95150 | | |
| 11 | −393.79520 | 3.10110 | 1.61997 | 63.9 |
| 12 | −43.75500 | 0.90160 | | |
| 13 | 153.21580 | 7.82660 | 1.43700 | 95.1 |
| 14 | −22.55550 | 1.91210 | | |
| 15 | −26.48780 | 1.50000 | 1.86966 | 20.0 |
| 16 | 468.49900 | 4.11370 | | |
| 17* | −44.19560 | 6.99980 | 1.80755 | 40.9 |
| 18* | −21.56590 | 2.19890 | | |
| 19 | 812.28990 | 13.28880 | 1.49700 | 81.6 |
| 20 | −42.83690 | 7.80040 | | |
| 21 | 101.63060 | 7.97330 | 1.92286 | 20.9 |
| 22 | −3400.55770 | 0.20000 | | |
| 23 | 38.55210 | 14.36440 | 1.92286 | 20.9 |
| 24 | 87.25620 | 14.83060 | | |
| 25 | −206.76260 | 5.00000 | 1.80809 | 22.8 |
| 26 | 40.23910 | 9.85260 | | |
| 27 | −43.34970 | 10.00000 | 1.77047 | 29.7 |
| 28 | 145.50380 | 20.63530 | | |
| 29 | −131.40230 | 12.26560 | 1.85451 | 25.2 |
| 30 | −44.99820 | variable | | |
| 31 | 190.49780 | 6.17690 | 1.77250 | 49.6 |
| 32 | −190.49780 | 46.41300 | | |
| 33 | −58.51590 | 1.50000 | 1.59270 | 35.4 |
| 34 | 58.51590 | 2.91820 | | |
| 35 | 67.36960 | 8.02280 | 1.49700 | 81.6 |
| 36 | −48.29860 | variable | | |
| 37 | 30.10300 | 6.09710 | 1.67300 | 38.3 |
| 38 | 74.84630 | 1.94440 | | |
| 39 (Aperture) | ∞ | 0.20000 | | |
| 40 | 38.39860 | 1.50000 | 1.51680 | 64.2 |
| 41 | 19.46830 | 28.15090 | | |
| 42 | −25.75810 | 1.50000 | 1.73800 | 32.3 |
| 43 | −371.86770 | 1.08800 | | |
| 44 | 212.77180 | 7.86660 | 1.43700 | 95.1 |
| 45 | −30.38530 | variable | | |
| 46 | 69.06990 | 7.72600 | 1.49700 | 81.6 |
| 47 | −69.06990 | 1.01110 | | |
| 48 | 63.91460 | 1.80000 | 1.73800 | 32.3 |
| 49 | 32.04800 | 3.26340 | | |
| 50 | 38.12480 | 10.05400 | 1.43700 | 95.1 |
| 51 | −73.76000 | variable | | |
| 52 (P) | ∞ | 31.90000 | 1.51680 | 64.2 |
| 53 | ∞ | BF | | |
| Image plane | ∞ | | | |

Aspherical Data

7th Surface

K=0.00000E+00, A4=2.65545E-06, A6=−8.20476E-08, A8=1.02989E-10, A10=−2.05854E-13, A12=1.64815E-16

8th Surface

K=−8.18557E-01, A4=−7.36148E-06, A6=−1.13323E-07, A8=−1.79012E-10, A10=5.00901E-13, A12=7.89965E-16

17th Surface

K=0.00000E+00, A4=−9.22575E-07, A6=1.46881E-08, A8=−2.16849E-10, A10=8.13184E-13, A12=−8.00140E-16

18th Surface

K=0.00000E+00, A4=9.92281E-06, A6=1.18818E-08, A8=7.61350E-11, A10=−3.73431E-13, A12=9.91327E-16

TABLE 20

| Various data | | | |
|---|---|---|---|
| Zoom ratio | 1.07267 | | |
| | WIDE-ANGLE | INTER-MEDIATE | TELE-PHOTO |
| Focal length | −5.4340 | −5.6116 | −5.8289 |
| F number | −1.99436 | −1.99443 | −1.99526 |
| Angle of view | −67.2198 | −66.6052 | −65.8554 |
| Image height | 13.2500 | 13.2500 | 13.2500 |
| Total length of lens | 500.0162 | 500.0249 | 500.0356 |
| BF | 1.71656 | 1.72523 | 1.73588 |
| d30 | 103.3546 | 97.7428 | 90.8705 |
| d36 | 2.0000 | 7.6118 | 14.4841 |
| d45 | 2.9795 | 2.5780 | 2.0106 |
| d51 | 16.4082 | 16.8098 | 17.3772 |
| Position of entrance pupil | 34.8481 | 34.8751 | 34.9128 |
| Position of exit pupil | −1089.0610 | −938.8302 | −785.7288 |
| Position of front principal point | 29.3870 | 29.2300 | 29.0407 |
| Position of rear principal point | 505.4237 | 505.6083 | 505.8340 |

TABLE 21

| Focus data | | | | |
|---|---|---|---|---|
| | | WIDE-ANGLE | INTER-MEDIATE | TELE-PHOTO |
| Object distance | | 1080 | | |
| | d4 | 2.150 | 2.150 | 2.150 |
| | d18 | 2.199 | 2.199 | 2.199 |
| | d24 | 14.831 | 14.831 | 14.831 |
| | d28 | 20.635 | 20.635 | 20.635 |
| Object distance | | 780 | | |
| | d4 | 2.000 | 2.011 | 2.022 |
| | d18 | 2.349 | 2.338 | 2.328 |
| | d24 | 14.801 | 14.806 | 14.811 |
| | d28 | 20.665 | 20.660 | 20.655 |
| Object distance | | 2900 | | |
| | d4 | 2.340 | 2.345 | 2.349 |
| | d18 | 2.009 | 2.004 | 2.000 |
| | d24 | 14.846 | 14.850 | 14.853 |
| | d28 | 20.620 | 20.616 | 20.613 |

TABLE 22

| Single lens data | | |
|---|---|---|
| Lens element | First surface | Focal length |
| 1 | 1 | −124.5269 |
| 2 | 3 | 165.6185 |

TABLE 22-continued

| Single lens data | | |
|---|---|---|
| Lens element | First surface | Focal length |
| 3 | 5 | −53.5581 |
| 4 | 7 | −47.6496 |
| 5 | 9 | 116.5722 |
| 6 | 11 | 79.1302 |
| 7 | 13 | 45.6086 |
| 8 | 15 | −28.7871 |
| 9 | 17 | 45.8229 |
| 10 | 19 | 82.2979 |
| 11 | 21 | 107.0469 |
| 12 | 23 | 65.5614 |
| 13 | 25 | −41.3095 |
| 14 | 27 | −42.3727 |
| 15 | 29 | 75.1679 |
| 16 | 31 | 124.1769 |
| 17 | 33 | −49.1293 |
| 18 | 35 | 57.9356 |
| 19 | 37 | 70.9349 |
| 20 | 40 | −78.5328 |
| 21 | 42 | −37.5692 |
| 22 | 44 | 61.4472 |
| 23 | 46 | 70.8015 |
| 24 | 48 | −89.2386 |
| 25 | 50 | 59.1300 |

TABLE 23

| | | | | Zoom lens group data | |
|---|---|---|---|---|---|
| Gr. | 1st. surf. | Focal length | Length of lens group | Position of front principal point | Position of rear principal point |
| 1 | 1 | 16.48522 | 204.42490 | 52.09399 | 62.21248 |
| 2 | 31 | 150.08891 | 65.03090 | 13.10085 | 8.23154 |
| 3 | 37 | −344.55362 | 48.34700 | 100.97337 | 84.37174 |
| 4 | 46 | 52.45503 | 23.85450 | 8.74509 | 13.90466 |

TABLE 24

| | | Zoom lens group magnification ratio | | |
|---|---|---|---|---|
| Gr. | 1st. surf. | WIDE-ANGLE | INTER-MEDIATE | TELE-PHOTO |
| 1 | 1 | −0.01478 | −0.01478 | −0.01478 |
| 2 | 31 | −1.63406 | −1.74040 | −1.89110 |
| 3 | 37 | 3.16154 | 3.49322 | 4.15682 |
| 4 | 46 | 0.06385 | 0.05603 | 0.04501 |

Numerical Example 5

Regarding the zoom lens system of numerical example 5 (corresponding to example 5), Table 25 shows surface data, Table 26 shows various data, Table 27 shows focus data and Table 28 shows single lens data, Table 29 shows zoom lens group data, and Table 30 shows zoom lens group magnification ratios (unit: mm).

TABLE 25

| Surface data | | | | |
|---|---|---|---|---|
| SURFACE NUMBER | r | d | nd | vd |
| Object plane | ∞ (infinity) | | | |
| 1 | 88.79440 | 4.50000 | 1.84666 | 23.8 |
| 2 | 45.96260 | 12.87710 | | |
| 3 | 77.07970 | 8.67150 | 1.85883 | 30.0 |
| 4 | 163.47200 | 0.20000 | | |
| 5 | 45.37300 | 2.50000 | 1.87071 | 40.7 |
| 6 | 23.65460 | 6.34460 | | |
| 7* | 23.71380 | 2.60000 | 1.58560 | 58.9 |
| 8* | 12.39230 | 14.53720 | | |
| 9 | 95.54600 | 3.78550 | 1.51680 | 64.2 |
| 10 | −134.46120 | 5.12560 | | |
| 11 | −325.87630 | 3.30500 | 1.61997 | 63.9 |
| 12 | −43.49010 | 0.91830 | | |
| 13 | 248.47470 | 7.41550 | 1.43700 | 95.1 |
| 14 | −22.58710 | 1.87100 | | |
| 15 | −26.56680 | 1.50000 | 1.86966 | 20.0 |
| 16 | 337.88950 | 4.16810 | | |
| 17* | −44.35840 | 6.96090 | 1.80755 | 40.9 |
| 18* | −21.62680 | 2.63650 | | |
| 19 | 1780.17270 | 14.27240 | 1.49700 | 81.6 |
| 20 | −40.98770 | 9.49680 | | |
| 21 | 108.83960 | 8.49450 | 1.92286 | 20.9 |
| 22 | −858.81440 | 0.20000 | | |
| 23 | 39.20050 | 12.95810 | 1.92286 | 20.9 |
| 24 | 82.84840 | 14.91680 | | |
| 25 | 294.69460 | 3.37660 | 1.80809 | 22.8 |
| 26 | 36.74180 | 12.83020 | | |
| 27 | −35.21470 | 10.00000 | 1.77047 | 29.7 |
| 28 | 139.02890 | 19.65150 | | |
| 29 | −137.81370 | 11.37870 | 1.85451 | 25.2 |
| 30 | −44.74660 | variable | | |
| 31 | 188.74600 | 6.37460 | 1.77250 | 49.6 |
| 32 | −188.74600 | 48.03280 | | |
| 33 | −59.54130 | 1.50000 | 1.59270 | 35.4 |
| 34 | 59.54130 | 3.27550 | | |
| 35 | 70.20590 | 7.75060 | 1.49700 | 81.6 |
| 36 | −48.47990 | variable | | |
| 37 | 29.46700 | 5.83130 | 1.67300 | 38.3 |
| 38 | 67.72600 | 2.07690 | | |
| 39 (Aperture) | ∞ | 0.20000 | | |
| 40 | 35.46470 | 1.50000 | 1.51680 | 64.2 |
| 41 | 19.25280 | 27.37380 | | |
| 42 | −25.79650 | 1.50000 | 1.73800 | 32.3 |
| 43 | −729.26630 | 1.42250 | | |
| 44 | 169.05880 | 8.31240 | 1.43700 | 95.1 |
| 45 | −29.99300 | variable | | |
| 46 | 71.64500 | 7.52880 | 1.49700 | 81.6 |
| 47 | −71.64500 | 1.07150 | | |
| 48 | 58.49540 | 1.80000 | 1.73800 | 32.3 |
| 49 | 31.34040 | 3.22660 | | |
| 50 | 36.80940 | 9.87230 | 1.43700 | 95.1 |
| 51 | −86.04480 | variable | | |
| 52 (P) | ∞ | 31.90000 | 1.51680 | 64.2 |
| 53 | ∞ | BF | | |
| Image plane | ∞ | | | |

Aspherical Data

7th Surface

K=0.00000E+00, A4=1.33381E-06, A6=−8.54803E-08, A8=1.08211E-10, A10=−2.00256E-13, A12=1.48509E-16

8th Surface

K=−8.23923E-01, A4=−4.33923E-06, A6=−1.20321E-07, A8=−2.01564E-10, A10=5.88066E-13, A12=7.31048E-16

17th Surface

K=0.00000E+00, A4=2.51830E-07, A6=1.55279E-08, A8=−2.19074E-10, A10=7.93288E-13, A12=−7.62050E-16

18th Surface

K=0.00000E+00, A4=1.03252E-05, A6=1.42481E-08,
A8=7.23515E-11,                    A10=−3.67521E-13,
A12=9.64012E-16

TABLE 26

| | Various data | | |
|---|---|---|---|
| Zoom ratio | 1.07260 | | |

| | WIDE-ANGLE | INTER-MEDIATE | TELE-PHOTO |
|---|---|---|---|
| Focal length | −5.4373 | −5.6148 | −5.8320 |
| F number | −1.99460 | −1.99448 | −1.99524 |
| Angle of view | −67.2101 | −66.5865 | −65.8280 |
| Image height | 13.2500 | 13.2500 | 13.2500 |
| Total length of lens | 500.0204 | 500.0299 | 500.0413 |
| BF | 1.72081 | 1.73026 | 1.74161 |
| d30 | 98.8970 | 93.1729 | 86.1126 |
| d36 | 2.0000 | 7.7241 | 14.7844 |
| d45 | 3.1395 | 2.6670 | 2.0000 |
| d51 | 16.2211 | 16.6936 | 17.3607 |
| Position of entrance pupil | 34.7348 | 34.7637 | 34.8042 |
| Position of exit pupil | −1108.7491 | −934.2393 | −764.4488 |
| Position of front principal point | 29.2708 | 29.1152 | 28.9278 |
| Position of rear principal point | 505.4312 | 505.6163 | 505.8428 |

TABLE 27

| | | Focus data | | |
|---|---|---|---|---|
| | | WIDE-ANGLE | INTER-MEDIATE | TELE-PHOTO |
| Object distance | | 1080 | | |
| | d18 | 2.637 | 2.637 | 2.637 |
| | d26 | 12.830 | 12.830 | 12.830 |
| | d28 | 19.652 | 19.652 | 19.652 |
| Object distance | | 780 | | |
| | d18 | 2.804 | 2.792 | 2.780 |
| | d26 | 12.794 | 12.802 | 12.810 |
| | d28 | 19.688 | 19.680 | 19.671 |
| Object distance | | 2900 | | |
| | d18 | 2.405 | 2.400 | 2.396 |
| | d26 | 12.846 | 12.847 | 12.848 |
| | d28 | 19.636 | 19.635 | 19.634 |

TABLE 28

| | Single lens data | |
|---|---|---|
| Lens element | First surface | Focal length |
| 1 | 1 | −118.2369 |
| 2 | 3 | 162.2974 |
| 3 | 5 | −59.9693 |
| 4 | 7 | −48.4328 |
| 5 | 9 | 108.6899 |
| 6 | 11 | 80.5918 |
| 7 | 13 | 47.7771 |
| 8 | 15 | −28.2675 |
| 9 | 17 | 45.9707 |
| 10 | 19 | 80.8244 |
| 11 | 21 | 105.1148 |
| 12 | 23 | 70.5710 |
| 13 | 25 | −52.2494 |
| 14 | 27 | −35.5798 |
| 15 | 29 | 73.4074 |
| 16 | 31 | 123.0714 |
| 17 | 33 | −49.9943 |
| 18 | 35 | 58.9793 |
| 19 | 37 | 73.0297 |
| 20 | 40 | −84.1486 |
| 21 | 42 | −36.2692 |
| 22 | 44 | 59.0418 |
| 23 | 46 | 73.3571 |
| 24 | 48 | −94.1281 |
| 25 | 50 | 60.4722 |

TABLE 29

| | | | Zoom lens group data | | |
|---|---|---|---|---|---|
| Gr. | 1st. surf. | Focal length | Length of lens group | Position of front principal point | Position of rear principal point |
| 1 | 1 | 15.95906 | 207.49240 | 51.40982 | 71.61421 |
| 2 | 31 | 148.03533 | 66.93350 | 13.73589 | 8.01846 |
| 3 | 37 | −401.76280 | 48.21690 | 106.21106 | 88.97848 |
| 4 | 46 | 53.17901 | 23.49920 | 8.26145 | 13.42641 |

TABLE 30

| | | Zoom lens group magnification ratio | | |
|---|---|---|---|---|
| Gr. | 1st. surf. | WIDE-ANGLE | INTER-MEDIATE | TELE-PHOTO |
| 1 | 1 | −0.01431 | −0.01431 | −0.01431 |
| 2 | 31 | −1.75630 | −1.88426 | −2.07031 |
| 3 | 37 | 2.49760 | 2.72122 | 3.15953 |
| 4 | 46 | 0.07772 | 0.06866 | 0.05590 |

Table 31 below shows the corresponding values of the respective conditional expressions (1) to (8) in the respective numerical examples.

TABLE 31

| Condition | | Ex. 1 | Ex. 2 | Ex. 3 | Ex. 4 | Ex. 5 |
|---|---|---|---|---|---|---|
| (1) | $\beta p2$ | 0.236 | 0.214 | 0.244 | 0.235 | 0.243 |
| (2) | $\beta n$ | 0.554 | 0.563 | 0.544 | 0.566 | 0.628 |
| (3) | $\beta p1$ | −0.041 | −0.045 | −0.041 | −0.119 | −0.041 |
| (4) | fp1/fo | 4.17 | 4.60 | 4.04 | 4.43 | 4.05 |
| (5) | fn/fo | −1.67 | −1.69 | −1.63 | −1.71 | −3.20 |
| (6) | (R2 + R1)/ (R2 − R1) | −0.867 | −1.013 | −0.844 | −0.900 | −0.955 |

TABLE 31-continued

| Condition | | Ex. 1 | Ex. 2 | Ex. 3 | Ex. 4 | Ex. 5 |
|---|---|---|---|---|---|---|
| (7) | npd | 1.85451 | 1.85451 | 1.85451 | 1.85451 | 1.85451 |
| (8) | vpd | 25.2 | 25.2 | 25.2 | 25.2 | 25.2 |

Table 32 below shows the corresponding values of the respective conditional expressions (1) to (8) in the respective numerical examples.

TABLE 32

| | Ex. 1 | Ex. 2 | Ex. 3 | Ex. 4 | Ex. 5 |
|---|---|---|---|---|---|
| fo | 10.811 | 10.712 | 11.148 | 10.764 | 11.133 |
| fp1 | 45.100 | 49.324 | 45.067 | 47.700 | 45.083 |
| fn | −18.081 | −18.082 | −18.187 | −18.377 | −35.580 |
| R1 | 601.520 | −5983.665 | 526.649 | 812.290 | 1780.173 |
| R2 | −42.879 | −39.949 | −44.443 | −42.837 | −40.988 |

Note:
fo is a focal length of the entire magnification optical system positioned on a magnification side with respect to the intermediate imaging position,
fp1 is a focal length of the first positive lens group,
fn is a focal length of the negative lens group,
R1 is a radius of curvature of the surface on the magnification side of the magnification side-closest lens element, and .
R2 is a radius of curvature of the surface on the reduction side of the magnification side-closest lens element.

Second Embodiment

Figure 26:
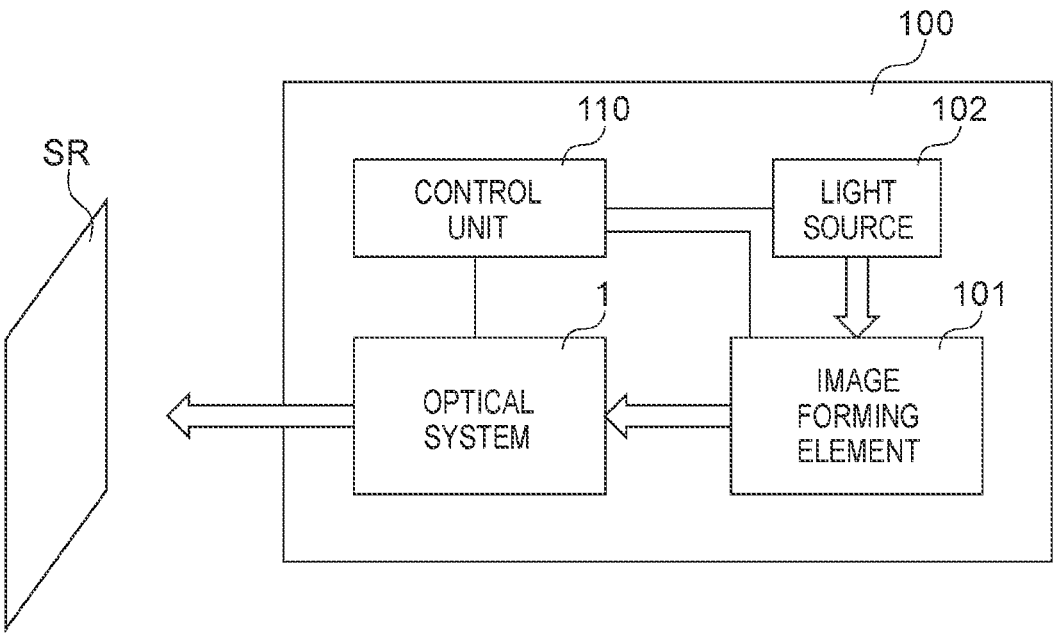
FIG. 26 is a block diagram showing an example of an image projection apparatus according to the present disclosure.

Hereinafter, a second embodiment of the present disclosure is described with reference to FIG. 26. FIG. 26 is a block diagram showing an example of the image projection apparatus according to the present disclosure. The image projection apparatus 100 includes such an optical system 1 as disclosed in the first embodiment, an image forming element 101, a light source 102, a control unit 110, and others. The image forming element 101 is constituted of, for example, liquid crystal or DMD, for generating an image to be projected through the optical system 1 onto a screen SR. The light source 102 is constituted of such as a light emitting diode (LED) or a laser, and supplies light to the image forming element 101. The control unit 110 is constituted of, for example, central processing unit (CPU) or micro-processing unit (MPU), for controlling the entire apparatus and respective components. The optical system 1 may be configured as an interchangeable lens that can be detachably attached to the image projection apparatus 100. In this case, an apparatus in which the optical system 1 is removed from the image projection apparatus 100 is an example of a main body apparatus.

The image projection apparatus 100 described above can realize a wide-angle zoom function while achieving reduction in size and weight of the apparatus by employing the optical system 1 according to the first embodiment.

Third Embodiment

Figure 27:
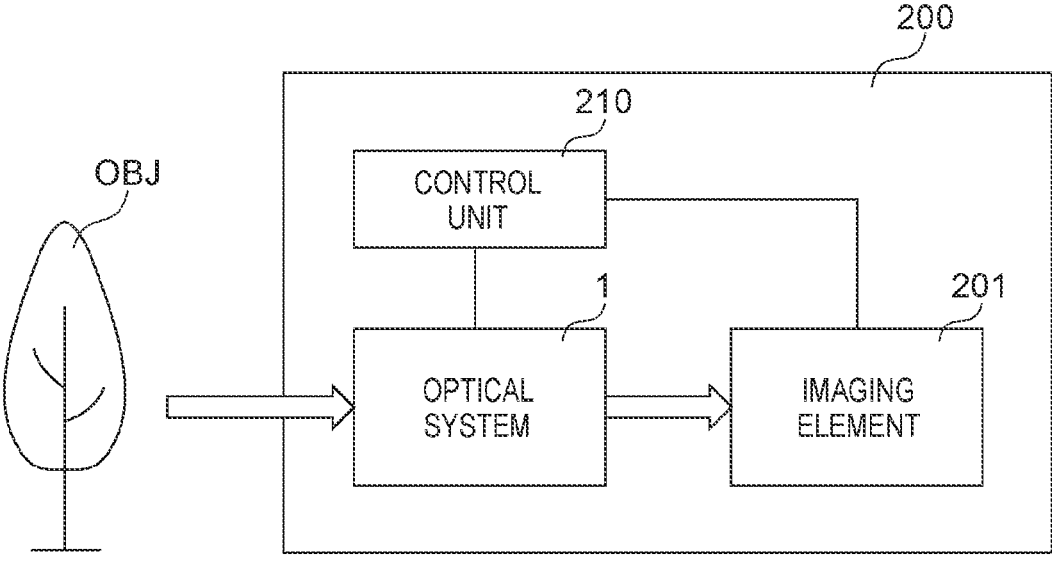
FIG. 27 is a block diagram showing an example of an imaging apparatus according to the present disclosure.

Hereinafter, a third embodiment of the present disclosure is described with reference to FIG. 27. FIG. 27 is a block diagram showing an example of the imaging apparatus according to the present disclosure. The imaging apparatus 200 includes such an optical system 1 as disclosed in the first embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPU or MPU, for controlling the entire apparatus and respective components. The optical system 1 may be configured as an interchangeable lens that can be detachably attached to the imaging apparatus 200. In this case, a apparatus in which the optical system 1 is removed from the imaging apparatus 200 is an example of a main body apparatus.

The imaging apparatus 200 described above can realize a wide-angle zoom function while achieving reduction in size and weight of the apparatus by employing the optical system 1 according to the first embodiment.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system internally having an intermediate imaging position that is conjugate with both of a magnification conjugate point on a magnification side and a reduction conjugate point on a reduction side, the optical system comprising:
   a first positive lens group including a plurality of lens elements and positioned on the magnification side with respect to the intermediate imaging position;
   a second positive lens group including a plurality of lens elements and positioned between the first positive lens group and the intermediate imaging position; and
   a negative lens group including a plurality of lens elements and positioned on the reduction side with respect to the intermediate imaging position, wherein, during focusing, the first positive lens group and the negative lens group move in an optical axis direction, and the second positive lens group is stationary.

2. The optical system according to claim 1, satisfying the following condition (1):

$$0.10 < \beta p2 < 0.35 \tag{1}$$

where $\beta p2$ is a lateral magnification of the second positive lens group.

3. The optical system according to claim 1, satisfying the following condition (2):

$$0.2 < \beta n < 1.0 \tag{2}$$

where $\beta n$ is a lateral magnification of the negative lens group.

4. The optical system according to claim 1, satisfying the following condition (3):

$$-0.2 < \beta p1 < 0.0 \tag{3}$$

where $\beta p1$ is a lateral magnification of the first positive lens group.

5. The optical system according to claim 1, satisfying the following condition (4):

$$2.0 < fp1/fo < 10.0 \tag{4}$$

where fp1 is a focal length of the first positive lens group, and fo is a focal length of the entire magnification optical system positioned on a magnification side with respect to the intermediate imaging position.

6. The optical system according to claim 1, satisfying the following condition (5):

$$-5.0 < fn/fo < -1.0 \tag{5}$$

where fn is a focal length of the negative lens group, and fo is a focal length of the entire magnification optical system positioned on the magnification side with respect to the intermediate imaging position.

7. The optical system according to claim 1, wherein a magnification side-closest lens element positioned closest to the magnification side of the second positive lens group has a positive power and satisfies the following condition (6):

$$-1.40 < (R2+R1)/(R2-R1) < -0.70 \tag{6}$$

where R1 is a radius of curvature of the surface on the magnification side of the magnification side-closest lens element, and R2 is a radius of curvature of the surface on the reduction side of the magnification side-closest lens element.

8. The optical system according to claim 1, further comprising an adjacent lens element adjacent to the reduction side of the negative lens group and having a positive power, and satisfying the following condition (7):

$$npd > 1.85 \tag{7}$$

where npd is a refractive index of the adjacent lens element.

9. The optical system according to claim 1, further comprising an adjacent lens element adjacent to the reduction side of the negative lens group and having a positive power, and satisfying the following condition (8):

$$25 < vpd < 30 \tag{8}$$

where vpd is an Abbe number of the adjacent lens element.

10. The optical system according to claim 1, wherein the negative lens group includes a lens element positioned closest to the magnification side among the plurality of lens elements positioned on the reduction side with respect to the intermediate imaging position.

11. The optical system according to claim 1, wherein the negative lens group is constituted of two lens elements each having a biconcave shape.

12. The optical system according to claim 1, wherein the first positive lens group includes a lens element positioned closest to the magnification side among the plurality of lens elements positioned on the magnification side with respect to the intermediate imaging position.

13. An image projection apparatus comprising:
   the optical system according to claim 1; and
   an image forming element that generates an image to be projected through the optical system onto a screen.

14. An imaging apparatus comprising:
   the optical system according to claim 1; and
   an imaging element that receives an optical image formed by the optical system to convert the optical image into an electrical image signal.

* * * * *